United States Patent [19]

Lenko

[11] 4,412,387
[45] Nov. 1, 1983

[54] DIGITAL COMPASS HAVING A RATIOMETRIC BEARING PROCESSOR

[75] Inventor: Daniel S. Lenko, Monrovia, Md.

[73] Assignee: The United States of America as represented by the Secretary of the Navy, Washington, D.C.

[21] Appl. No.: 376,474

[22] Filed: May 10, 1982

[51] Int. Cl.³ .............................................. G01C 17/28
[52] U.S. Cl. .................................... 33/361; 33/363 R
[58] Field of Search ...................... 33/361, 362, 363 R, 33/363 K, 363 L, 363 N, 363 Q, 355 R, 356

[56] References Cited

U.S. PATENT DOCUMENTS

| | | |
|---|---|---|
| 3,601,899 | 8/1971 | Artz . |
| 3,905,121 | 9/1975 | Takeda et al. ......................... 33/361 |
| 3,942,257 | 3/1976 | Erspamer .............................. 33/361 |
| 3,952,420 | 4/1976 | Benjamin et al. ..................... 33/361 |
| 3,959,889 | 6/1976 | Thomas ................................ 33/361 |
| 3,971,981 | 7/1976 | Nakagome et al. ................... 33/361 |
| 4,095,348 | 6/1978 | Kramer ............................. 33/363 K |
| 4,267,640 | 5/1981 | Wu ....................................... 33/361 |
| 4,379,366 | 4/1983 | Kuno et al. ........................ 33/363 R |

Primary Examiner—William D. Martin, Jr.
Attorney, Agent, or Firm—R. F. Beers; K. E. Walden; J. G. Wynn

[57] ABSTRACT

A digital compass including a two-axis earth's magnetic field sensor and a bearing processor computes the bearing for local display or transmission from a remote site to a local site for display and/or storage. The bearing processor portion of the digital compass includes an analog-to-digital converter configured for ratiometric measurements to compute the ratio of the x-axis and y-axis signals (smaller divided by the larger) from the aforementioned two-axis earth's magnetic field sensor. A programmable memory unit controlled, inter alia, by the data line outputs of the analog-to-digital converter, contains the arc tangent function for angles from 0° to 90°. The data line outputs from the memory unit defines a quadrant displacement angle in the range of 0° to 90° which is subsequently added to the cardinal point forming the lower boundary in bearing of the host quadrant.

16 Claims, 4 Drawing Figures

DIGITAL COMPASS HAVING A RATIOMETRIC BEARING PROCESSOR

BACKGROUND OF THE INVENTION

1. Field of the Invention

The present invention relates generally to an apparatus for measuring angular displacement or bearing relative to the earth's magnetic field, but more specifically the present invention relates to a digital compass including a bearing processor that uses ratiometric computation techniques to compute bearing.

2. Description of the Prior Art

The prior art is replete with compasses of various forms, varying from the simplest form of compass used by surveyors, which consists of a light, thin magnet (compass needle) pivoted so that it can turn freely about an axis perpendicular to its length, and with the north seeking end clearly marked. A compass card is mounted in the plane parallel to that which the compass needle can turn and is used as a marking system for reading the instrument, to the more sophisticated compasses of the electronic type which use digital processing techniques to compute bearing thereby giving direction in response to the earth's magnetic field which is the function of all compasses simple or sophisticated.

While the modern day compass of the electronic or digital type has made advances in the prior art, there are still problems which merit solutions. For example, the bearing update rate is too slow for certain applications, the power consumption is too high for reliable battery operation in remote locations for long periods of time, and the IC package count for compact configuration and low power consumption is too high. Since one application of the digital compass of the present invention is its usage in mines, two critical requirements are low power consumption and miniaturization. There is also a need to improve the bearing update rate and lower the power dissipation without adversely degrading the resolution or accuracy.

As further background material, Kramer, in U.S. Pat. No. 4,095,348, patented on June 20, 1978, discloses a digital compass employing an incremental encoder including a digitally encoded disc and a sensor unit which coact with a logic circuit so as to permit automatic referencing of the digital compass when power is initially applied. Digital recording of the direction and degree or extent of the compass in a given direction is also provided.

Thomas, in U.S. Pat. No. 3,959,889, patented on June 1, 1976, discloses an apparatus for determining the measured direction of an object relative to the earth's magnetic field. The apparatus includes a device for establishing a magnetic field rotating at a constant angular velocity to influence the earth's magnetic field. A detector is disposed for detecting the occurrence of a predetermined angular relationship between the rotating and the earth's magnetic field vectors. A timing device measures the time between the occurrence of the predetermined angular relationship, between the rotating and the earth's magnetic field vectors and the occurrence of the same predetermined angular relationship between the rotating field vector and the measured direction. A comparator compares the measured time with the period of rotation of the rotating magnetic field. The resulting ratio of measured time to the period is directly proportional to the angle which the direction makes relative to the earth's magnetic field.

Takeda et al., in U.S. Pat. No. 3,905,121, patented on Sept. 16, 1975, disclose an apparatus for indicating the direction of an object of the earth's surface. It includes a magneto-electric transducer for detecting terrestrial magnetism, a device for amplifying the output of the transducer, and a device for indicating the direction of the object according to the terrestrial magnetism in relationship to the position of the object.

Artz, in U.S. Pat. No. 3,601,899, patented of Aug. 31, 1971, discloses a solid state compass including a sensing element and a device for conditioning the sensed signal. The sensing element comprises four coils equally spaced around a single toroidal core. Diametrically opposite coils are connected to opposite sides of a center-tapped transformer so that in the absence of an external magnetic field the signals cancel. The presence of an external magnetic field unbalances the coils and produces a directional signal.

The prior art, as indicated hereinabove, includes some advanced electronic and digital compasses. However, insofar as can be determined, no prior art compass incorporates the features and advantages of the present invention.

OBJECTS OF THE INVENTION

Accordingly, an important object of the present invention is to configure a digital compass to include a bearing processor that uses ratiometric consumption techniques to compute bearing.

A further object of the present invention is to update bearing so as to decrease update time.

Another object of the present invention is to decrease the overall power dissipation without degrading the resolution or accuracy of the digital compass.

Still another object of the present invention is to configure the digital compass to express bearing in an analog or digital format.

SUMMARY OF THE INVENTION

The apparatus, according to the present invention, by which the foregoing and other objects, features and advantages are accomplished and realized is characterized by a digital compass including a two-axis earth's magnetic field sensor and a bearing processor, the bearing processor having an analog-to-digital converter configured for ratiometric measurements to compute the ratio of the signals (smaller divided by the larger) from the two axes of the earth's magnetic field sensor, aforementioned, in such a way that a bearing is computed as referenced to the cardinal point which forms the lower boundary in bearing of the quadrant of interest.

The apparatus operates so that the earth's magnetic field sensor generates two bipolar analog signals when it is rotated in the earth's magnetic field. The bearing is computed by having the analog-to-digital converter, in the aforementioned ratiometric configuration, perform the division of the two axis information and by incorporating a memory unit having look-up tables to evaluate the arc tangent of the above mentioned ratio.

BRIEF DESCRIPTION OF THE DRAWINGS

The foregoing and other objects, novel features and advantages of the present invention will be apparent from the following more particular description of the preferred embodiments as illustrated in the accompanying drawings, in which.

DESCRIPTION OF THE PREFERRED EMBODIMENTS

Figure 3:
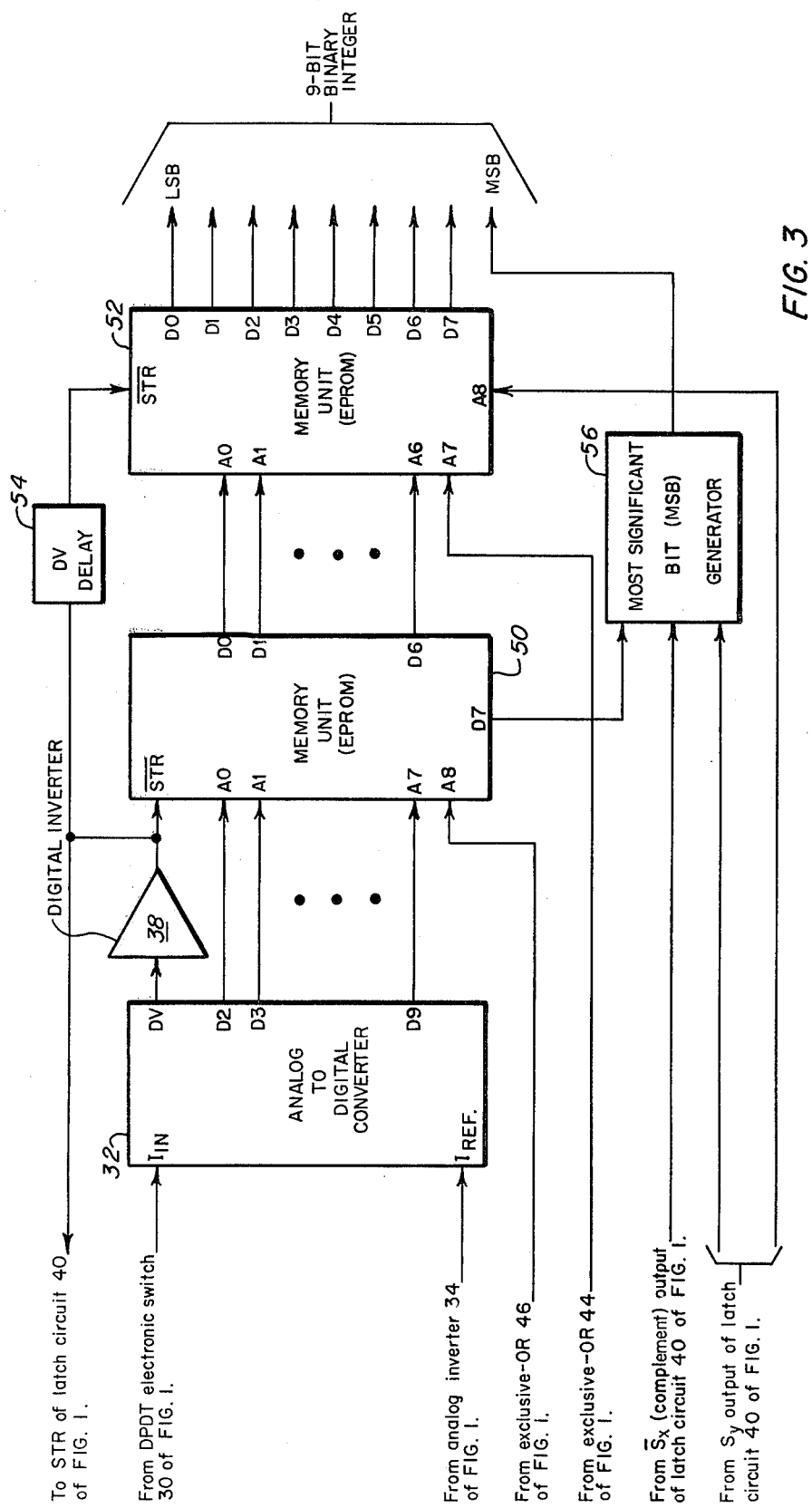
FIG. 3 is a partial block diagram representation, to be used in conjunction with the digital compass of FIG. 1, of a 9-bit binary integer bearing form of a digital compass according to the present invention.
Figure 4:
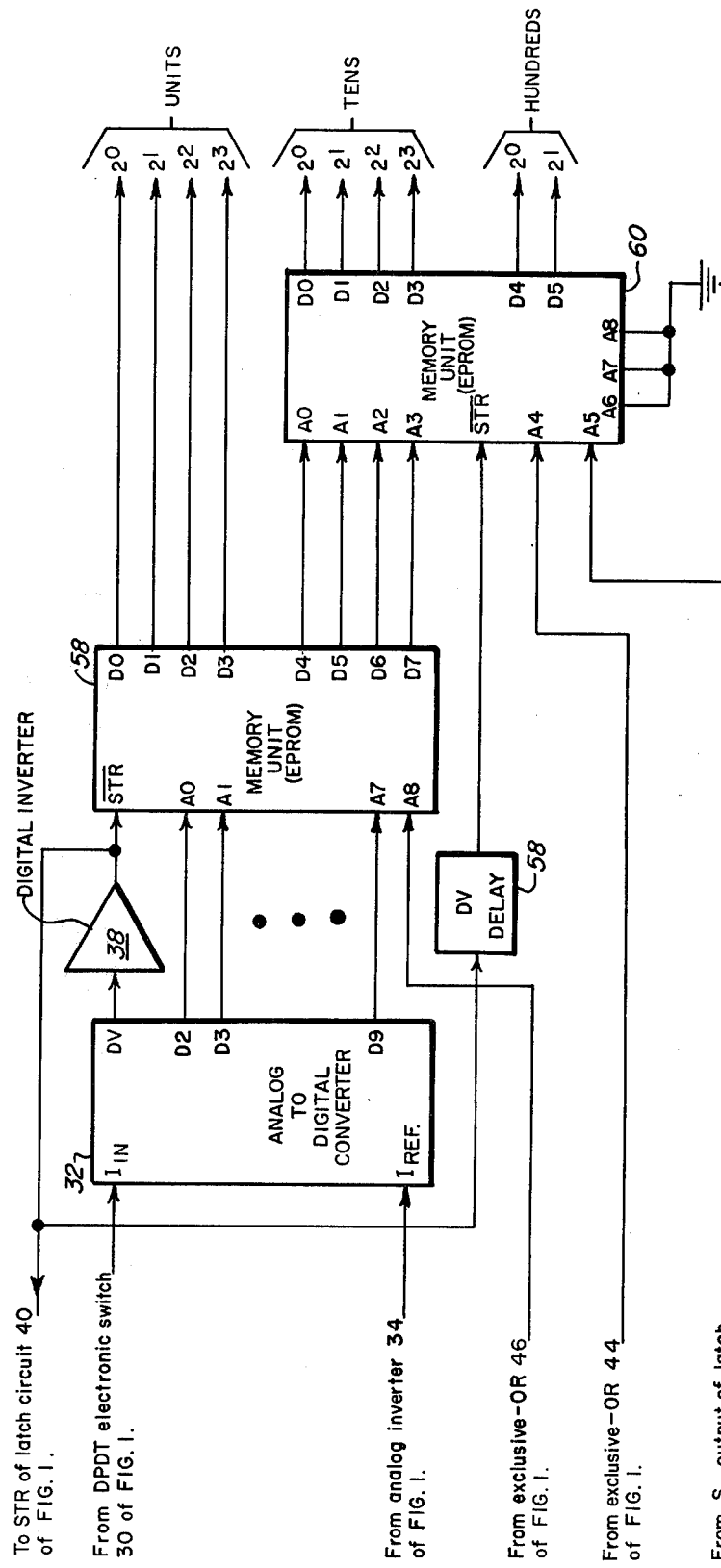
FIG. 4 is a partial block diagram representation, to be used in conjunction with the digital compass of FIG. 1, of a three-digit binary-coded-decimal (BCD) integer bearing form of a digital compass according to the present invention.

The following is a description of an embodiment of a digital compass in which the present invention is employed to measure and display the bearing or heading. The operation of the digital compass of FIG. 1 along with a description and operation of variations thereof depicted in FIGS. 3 and 4, are described and explained hereinafter under the heading "Statement of the Operation."

Figure 1:
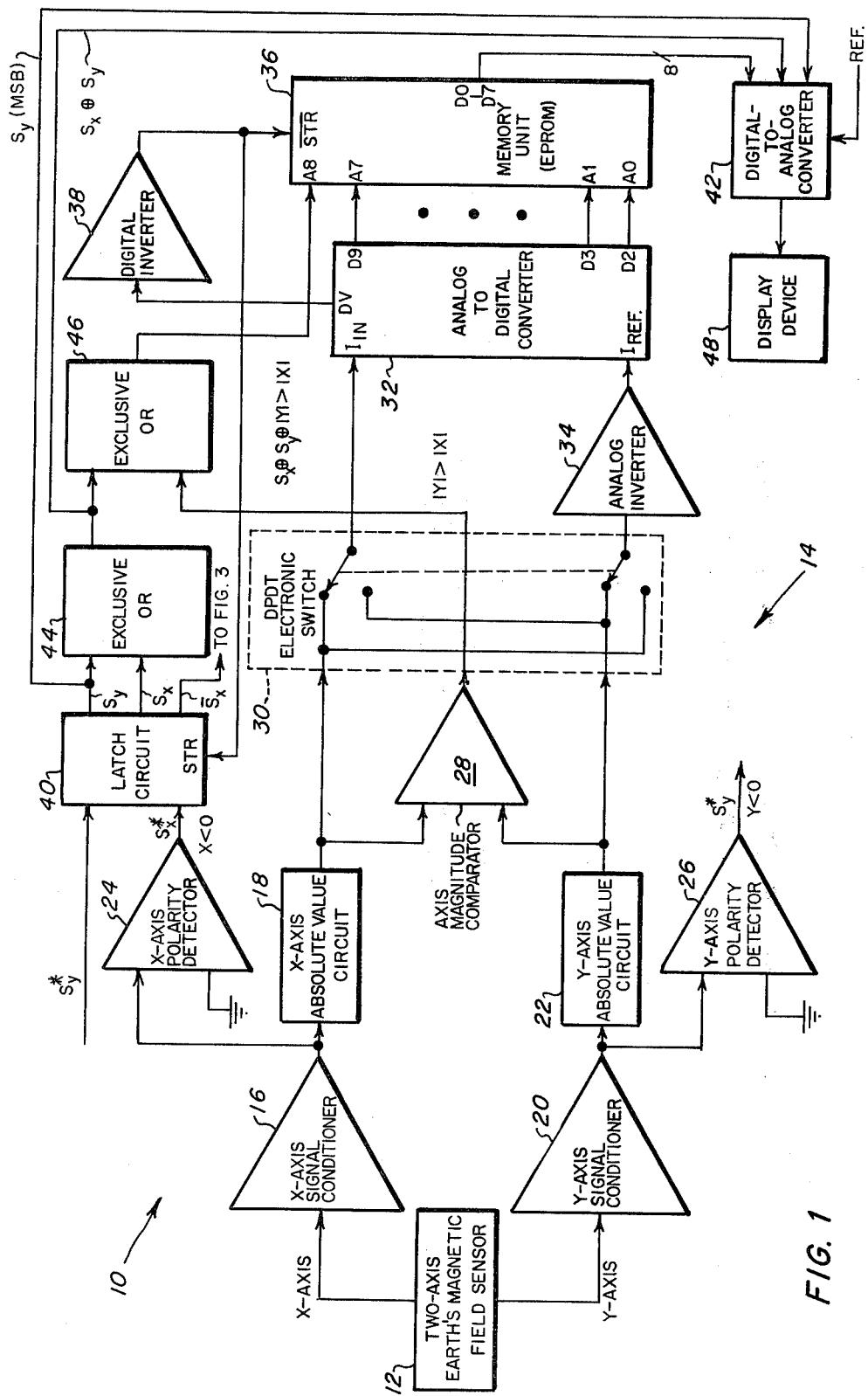
FIG. 1 is a block diagram representation of a digital compass including a two-axis earth's magnetic field sensor and a ratiometric bearing processor according to the present invention.

FIG. 1 shows a digital compass 10 embodying the present invention. It comprises a two-axis earth's magnetic field sensor 12 having orthogonal axes for generating two bipolar analog signals for defining the position thereof relative to the earth's magnetic field, and a digital compass bearing processor 14 operatively connected to earth's magnetic field sensor 12 for processing the aforementioned two bipolar analog signals into a compass heading or bearing. For purposes of the present invention, two-axis earth's magnetic field sensor 12 can be a Brown magnetometer such as that disclosed, for example, in U.S. Pat. No. 4,302,746 to Scarzello et al, entitled "Self-powered Vehicle Detection System," patented Nov. 24, 1981, and in U.S. Pat. No. 3,649,908 to Brown, entitled "Magnetic Field Gradiometer Utilizing a Pair of Cores Driven By a Blocking Oscillator," patented Mar. 14, 1972, both assigned to the same assignee as the present invention. In order to avoid tilt angle errors, two-axis earth's magnetic field sensor 12 must remain horizontal. This is most easily accomplished by mounting the magnetometer on a pendulum-type gimbal. A lead weight mounted beneath the magnetometer will keep it in a level attitude even though the gimbal mounts may be tilted. Of course, all gimbal material and mounts must be non-magnetic so as not to distort the earth's magnetic field.

The embodiment of digital compass bearing processor 14 illustrated in FIG. 1 includes an x-axis signal conditioner 16 for amplifying and buffering the x-axis signal from earth's magnetic field sensor 12 and feeding it to an x-axis absolute value circuit 18. The output of absolute value circuit 18 is a non-negative signal regardless of the polarity of the input signal thereto. Digital compass bearing processor 14 further includes a y-axis signal conditioner 20 for amplifying and buffering the y-axis signal from earth's magnetic field sensor 12 and feeding it to a y-axis absolute value circuit 22. Likewise, the output of absolute value circuit 22 is a non-negative signal regardless of the polarity of the input signal thereto. X-axis and y-axis signal conditioners 16 and 20 also drive an x-axis polarity detector 24 and a y-axis polarity detector 26, respectively. These detectors determine the signs of the x-axis signal and the y-axis signal from earth's magnetic field sensor 12. The control signals $S_x^*$ and $S_y^*$ generated from the aforementioned detectors are necessary for proper operation of digital compass 10. The output of x-axis absolute value circuit 18 drives one input of an axes magnitude comparator 28 and one set of terminals of a double-pole-double-throw (DPDT) electronic switch 30. The output of y-axis absolute value circuit 22 drives the other input of axes magnitude comparator 28 and the other set of terminals of DPDT electronic switch 30. The output of axes magnitude comparator 28 is operatively connected to the poles of DPDT electronic switch 30 for controlling the position of the switch. The function of DPDT electronic switch 30 is to always channel the larger of the two axes signals into the $I_{REF}$ input of an analog-to-digital converter 32 via an analog inverter 34 and the smaller axis signal into the $I_{IN}$ of analog-to-digital converter 32, aforementioned.

Still referring to the embodiment of FIG. 1, the outputs, data lines D9 through D2, of analog-to-digital converter 32 drive the respective inputs, addresses A7 thru A0, of a memory unit (EPROM) 36. A data valid (DV) output of analog-to-digital converter 32 via digital inverter 38 drives the store (STR) inputs of a latch circuit 40 and the $\overline{(STR)}$ input of the aforementioned memory unit 36 such that the $S_x$ and $S_y$ signals are latched in latch circuit 40 and a new axes ratio from analog-to-digital converter 32 are strobed into the addresses of memory unit 36. As shown, the input signals to latch circuit 40 are the sign signals $S_x^*$ and $S_y^*$ from x-axis polarity detector 24 and y-axis polarity detector 26, respectively. Analog-to-digital converter 32, according to the present invention, is configured for ratiometric measurements where the digital output is the ratio of $I_{IN}/I_{REF}$ which will always be less than or equal to 1.

To continue, the outputs, data lines D0 thru D7, of memory unit 36 drive a digital-to-analog converter 42. These outputs represent the quadrant displacement angle (8 bits). Two additional signals, $S_y$ from latch circuit 40 and $S_x \oplus S_y$ from an exclusive-OR circuit 44, designed to identify the quadrant of interest, drive digital-to-analog converter 42. In order to clarify which half-quadrant angle is being measured, an exclusive-OR circuit 46, with inputs as shown, is operatively connected to the input, address of A8, of memory unit 36 to convey the information that the outputs of analog-to-digital converter 32 is the ratio of angles from 0° through 45° or 90° to 45°. The output of digital-to-analog converter 42 drives a display device 48 having a linear scale which converts a signal 0 to −3.6 vdc to a corresponding bearing of 0° to 360°.

STATEMENT OF THE OPERATION

Figure 2:
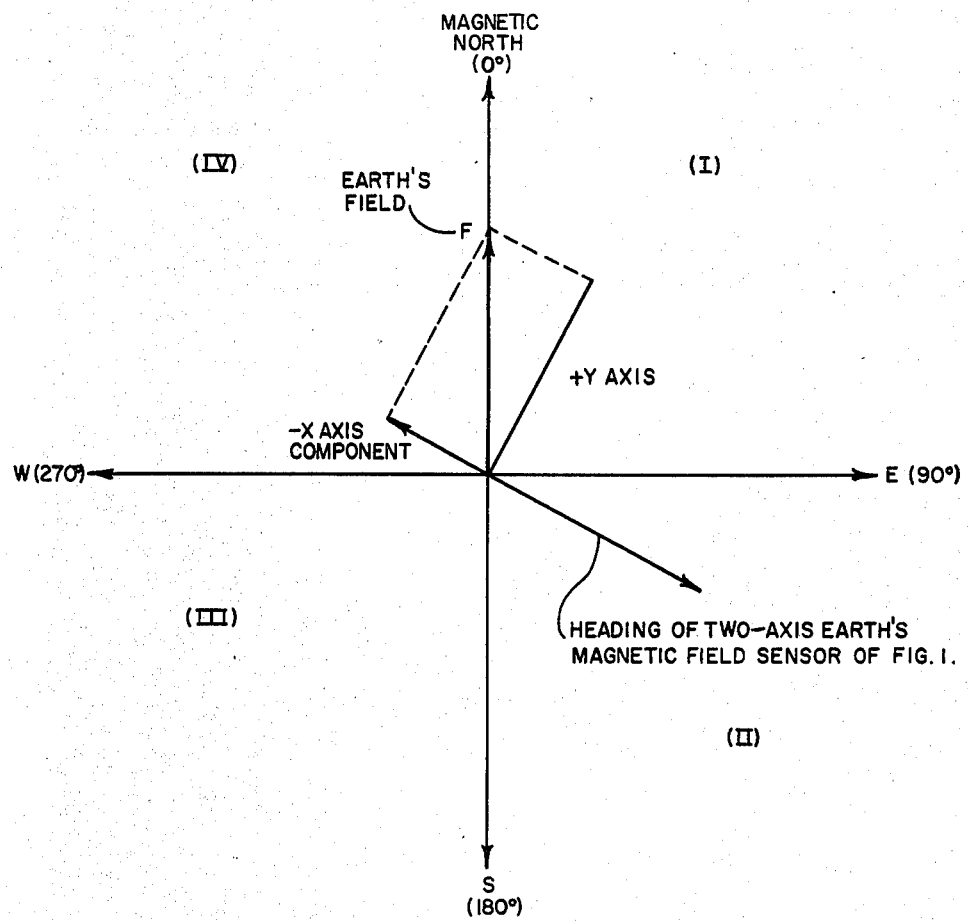
FIG. 2 is depicting the approximate orientation of the axes of the two-axis earth's magnetic field sensor of FIG. 1 relative to magnetic north and a bearing example according to the present invention.

Details of the operation, according to the present invention are now explained in conjunction with the block diagram of FIG. 1 and the bearing example plot of FIG. 2 viewed concurrently.

Two-axis earth's magnetic field sensor 12 has two orthogonal axes and generates x and y bipolar analog signals which define sine and cosine functions when it is rotated in the earth's magnetic field. The x-axis signal is amplified and buffered by signal conditioner 16 and then fed to absolute value circuit 18. Likewise, the y-axis signal is amplified and buffered by signal conditioner 20 and then fed to absolute value circuit 22. The x-axis signal and the y-axis signal information are full-wave rectified at unity gain in the respective absolute value circuits 18 and 22. The output of x-axis signal conditioner 16 also drives x-axis polarity detector 24 which determines the polarity of the x-axis signal and outputs a signal, $S_x^*$ as shown in FIG. 1. Likewise, the output of y-axis signal conditioner 20 also drives y-axis polarity detector 26 which determines the polarity of the y-axis signal and outputs a signal, $S_y^*$. The $S_x^*$ and $S_y^*$ signals are logical "0" for a respective positive axis and logical "1" for a respective negative axis information.

The $S_x^*$ and $S_y^*$ signals are stored in latch circuit 40 which provides $S_x$ and $S_y$ signals, respectively, upon completion of the bearing ratio computation. This storage is necessary due to the fact that earth's magnetic field sensor 12 will likely be rotating which means that $S_x^*$ or $S_y^*$ would change upon a quadrant boundary crossing creating large bearing errors. Thus, two important signals are derived from the axis sign data and the $|y| > |x|$ signal output from axes magnitude comparator 28. It should be mentioned that a logical "0" output from axes magnitude comparator 28 is indicative of the fact that $|y| < |x|$ and a logical "1" is indicative of the fact that $|y| > |x|$. The first is obtained by the exclusive OR'ing of the $S_x$ and $S_y$ signals in exclusive-OR circuit 44 which provides the signal $S_x \oplus S_y$. The other important signal, $S_x \oplus S_y \oplus (|y| > |x|)$, is derived by exclusive OR'ing of $S_x \oplus S_y$ and $|y| > |x|$ in exclusive-OR circuit 46. The use of each of the aforementioned signals are explained in more detail hereinafter.

Continuing, comparator 28 determines which axis has the larger absolute magnitude in order to control DPDP electronic switch 30 and the look-up table in memory unit 36. Bearing processor 14 is configured such that the larger axis output is always switched to the $I_{REF}$ input of analog-to-digital converter 32 via inverter 34 after a unity gain inversion therein, while the smaller axis output is always gated to the $I_{IN}$ input of analog-to-digital converter 32. In this ratiometric configuration, the output in digital form of analog-to-digital converter 32 is the ratio, $I_{IN}/I_{REF}$ or the signal on the smaller axis divided by the signal on the larger axis. This ratio will always be less than or equal to 1. A ratio of 1 corresponds to a full-scale digital code in hexadecimal of $FF_H$, whereas $OO_H$ represents a zero ratio.

In the usual trigonometric bearing computation situation, the first operation in a two-axis rectangular coordinate system, is to compute the reference angle of a vector determined by using the relationship $\theta = \arctan y/x$, where x is the vector component projected onto the abscissa axis and y is the vector component projected onto the ordinate axis. However, in the present invention computation situation, the above mentioned normal reference angle is not calculated since as configured, analog-to-digital converter 32 computes the ratio y/x only for angles 335° through 45° and 135° through 225° while the ratio x/y is determined for all the remaining angles. This computation technique is used in order to limit the computed ratio to less than or equal to 1. In the normal reference angle computation, the ratio y/x varies from zero (0°) to infinity (90°). Accordingly, analog-to-digital converter 32, which for purposes of the present invention is a 10-bit device using only eight bits, cannot reasonably represent the entire positive real line with only eight bits. Therefore, as soon as the ratio y/x is larger than 1 (the ratio 1 representing the bearing angle 45°), the ratio x/y is computed instead. Hence, analog-to-digital converter 32 outputs a ratio corresponding to angles from 0° to 45° only. As shown, the 8-bit output and the control signal output $S_x \oplus S_y \oplus (|y| > |x|)$ which identifies the half-quadrant location are conveyed to the 9 address inputs of memory unit 36. For purposes of the present invention, memory unit 36 is a UV-erasable programmable read-only-memory (EPROM) integrated circuit.

Memory unit 36, hereinafter EPROM 36, is programmed in such a fashion as to compute the arc tangent of either of the above ratios. As stated hereinabove, a typical reference angle is not computed, but a quadrant displacement angle is outputted by EPROM 36, i.e., EPROM 36 outputs an angle from 0° to 90° referenced to the cardinal point which forms the lower boundary of that quadrant. As an example, assume that two-axis Brown magnetometer 12 or like sensor is positioned in the earth's magnetic field to produce a bearing of 118°. FIG. 2 depicts the approximate orientation of the sensor axes relative to magnetic north. As shown, the y-axis component is larger than the x-axis component. Consequently, analog-to-digital converter 32, as aforementioned, will compute x/y, which in this example is 0.53 or an output from analog-to-digital converter 32 of $88_H$. EPROM 36 then takes the value $88_H$ along with the fact that $|y| > |x|$ and outputs $4F_H$ as indicated in the data listing in Appendix A. EPROM 36 is programmed to recover the non-linear arc tangent function from 0° to 90°, with EPROM 36 output $OO_H$ representing 0° and output $FF_H$ corresponding to 90°. In the above example: $(4F/FF)_{HEX} = (79/255)_{DEC}$, $(79/255)90° = 27.88°$; however, since the bearing is in the 2nd quadrant, the displacement angle is added to 90° (lower boundary of 2nd quadrant) to derive the correct bearing of 118°.

As shown in FIG. 1, the eight output lines of EPROM 36 feed into the eight least significant inputs of digital-to-analog converter 42. The remaining two data inputs to digital-to-analog converter 42 are the $S_y$ and the $S_x \oplus S_y$ signals previously mentioned. The $S_y$ signal which becomes the most significant bit (MSB) and the $S_x \oplus S_y$ (the second MSB) communicate in which quadrant the bearing resides. The resultant analog output of digital-to-analog converter 42 is a voltage from 0 to −3.60 vdc. In order to obtain the bearing in observable form, display device 48 such as a voltmeter is employed.

It is desirable in certain situations to have a digital bearing in a parallel 10-bit binary form for interface with a computer, for example. Consequently, by eliminating digital-to-analog converter 42 and display device 48, the ten bits are formed since the eight data lines from EPROM 36 provide the eight least significant bits and the signals $S_y$ and $S_x \oplus S_y$ provide the MSB and the second MSB, respectively.

For purposes of the invention, all memory units used herein are organized as 512 words each being eight bits wide.

Another embodiment provides the bearing rounded to the nearest integer represented in 9-bit binary form. A partial block diagram representation of this configuration is shown in FIG. 3. As shown, memory units (EPROMS) 50 and 52 along with a data valid (DV) delay circuit 54, the aforementioned digital inverter 38, and a most significant bit (MSB) generator 56 are operatively connected to the circuitry of FIG. 1 with memory unit 36, digital-to-analog converter 42, and display device 48 deleted. Data valid (DV) delay circuit 54 delays the DV signal from analog-to-digital converter 32 to allow the outputs of first memory unit 50 to settle before they are stored in the addresses of second memory unit 52. Memory unit 50 is programmed to output the bearing rounded to the nearest integer from $00_H(0°)$ to $5A_H(90°)$ representing the quadrant displacement angle. The contents of memory unit 50 are presented in Appendix B. The seven lower significant output bits of memory unit 50 feed into the seven lower address bits of memory unit 52. As can be seen, the $S_y$ and $S_x \oplus S_y$ signals control address inputs $A_8$ and $A_7$, respectively, of memory unit 52, providing thereby the necessary quadrant information. The eight data output bits of memory unit 52 generates the lower eight bits of the rounded integer bearing. The most significant bit (MSB) is generated by MSB generator 56 which functions according to the following logical operation:

$$MSB = (D_7 + \bar{S}_x)S_Y$$

where $D_7$ goes logical to "1" for quadrant displacement angles greater than or equal to 75°. The complement of $S_x$ ($\bar{S}_x$) is taken from, for example, latch circuit 40 of FIG. 1. Equivalently, the output or MSB goes to logical "1" for a bearing greater than or equal to 256°. Appendix C furnishes the contents of memory unit 52. A useful application of the foregoing format is if the integral value of the bearing is to be transmitted by means of a pulse train. The number of pulses transmitted per sample would equal to the bearing.

Should there be the requirement of a visual real-time indication of bearing, then the binary-coded-decimal (BCD) information provided by the embodiment of FIG. 4 can be interfaced directly to a digital readout device (not shown) with or without an intermediate data communications link. Here, as before, a memory unit 58 is operatively interfaced to the circuitry of FIG. 1 with memory unit 36, digitalto-analog converter 42 and display device 48 deleted as aforementioned in conjunction with the embodiment of FIG. 3. As before, digital inverter 38 is operatively connected between analog-to-digital converter 32 and memory unit 58. Also, data valid (DV) delay circuit 54 now delays the DV signal from analog-to-dital converter 32 to allow the outputs of memory unit 58 to settle before they are stored in the addresses of memory unit 60. The contents of memory unit 58, however, are unique to this particular embodiment and are presented in Appendix B. The output of memory unit 58 provides the quadrant displacement angle in a two-digit BCD format. The "units" digit ($D_3$ thru $D_0$ outputs of memory unit 58) is the correct units digit of the measured bearing. Bits $D_7$ thru $D_4$ of memory unit 58 gives the "tens" digit of the quadrant displacement angle, but this digit must be modified by the quadrant information. Hence, bits $D_7$ thru $D_4$ of memory unit 58 drive address inputs $A_3$ thru $A_0$ of memory unit 60. The quadrant information, $S_y$ and $S_x \oplus S_y$, feed into the address inputs $A_5$ and $A_4$, respectively, of memory unit 60. The output of memory unit 60 provides the 10's and 100's digits for the measured bearing. The contents of memory unit 60 are presented in Appendix D.

To those skilled in the art, many modifications and variations of the present invention are possible in light of the above teachings. It is therefore to be understood that the present invention can be practiced otherwise than as specifically described herein and still be within the spirit and scope of the appended claims.

APPENDIX A

| EPROM 36 ADDRESS (HEX) | | EPROM 36 CONTENTS (HEX) | | BEARING (QUADRANT) (DISPLACEMENT) |
|---|---|---|---|---|
| A8 | A7-A4 | A3-A0 | D7-D4 | D3-D0 | (ANGLE) |
| 0 | 0 | 0 | 0 | 0 | 0.00 |
| 0 | 0 | 1 | 0 | 1 | .35 |
| 0 | 0 | 2 | 0 | 1 | .35 |
| 0 | 0 | 3 | 0 | 2 | .71 |
| 0 | 0 | 4 | 0 | 3 | 1.06 |
| 0 | 0 | 5 | 0 | 3 | 1.06 |
| 0 | 0 | 6 | 0 | 4 | 1.42 |
| 0 | 0 | 7 | 0 | 4 | 1.42 |
| 0 | 0 | 8 | 0 | 5 | 1.77 |
| 0 | 0 | 9 | 0 | 6 | 2.13 |
| 0 | 0 | A | 0 | 6 | 2.13 |
| 0 | 0 | B | 0 | 7 | 2.48 |
| 0 | 0 | C | 0 | 8 | 2.83 |
| 0 | 0 | D | 0 | 8 | 2.83 |
| 0 | 0 | E | 0 | 9 | 3.19 |
| 0 | 0 | F | 0 | A | 3.54 |
| 0 | 1 | 0 | 0 | A | 3.54 |
| 0 | 1 | 1 | 0 | B | 3.90 |
| 0 | 1 | 2 | 0 | B | 3.90 |
| 0 | 1 | 3 | 0 | C | 4.25 |
| 0 | 1 | 4 | 0 | D | 4.61 |
| 0 | 1 | 5 | 0 | D | 4.61 |
| 0 | 1 | 6 | 0 | E | 4.96 |
| 0 | 1 | 7 | 0 | F | 5.31 |
| 0 | 1 | 8 | 0 | F | 5.31 |
| 0 | 1 | 9 | 1 | 0 | 5.67 |
| 0 | 1 | A | 1 | 0 | 5.67 |
| 0 | 1 | B | 1 | 1 | 6.02 |
| 0 | 1 | C | 1 | 2 | 6.38 |
| 0 | 1 | D | 1 | 2 | 6.38 |
| 0 | 1 | E | 1 | 3 | 6.73 |
| 0 | 1 | F | 1 | 4 | 7.09 |
| 0 | 2 | 0 | 1 | 4 | 7.09 |
| 0 | 2 | 1 | 1 | 5 | 7.44 |
| 0 | 2 | 2 | 1 | 5 | 7.44 |
| 0 | 2 | 3 | 1 | 6 | 7.80 |
| 0 | 2 | 4 | 1 | 7 | 8.15 |
| 0 | 2 | 5 | 1 | 7 | 8.15 |
| 0 | 2 | 6 | 1 | 8 | 8.50 |
| 0 | 2 | 7 | 1 | 9 | 8.86 |
| 0 | 2 | 8 | 1 | 9 | 8.86 |
| 0 | 2 | 9 | 1 | A | 9.21 |
| 0 | 2 | A | 1 | A | 9.21 |
| 0 | 2 | B | 1 | B | 9.57 |
| 0 | 2 | C | 1 | C | 9.92 |
| 0 | 2 | D | 1 | C | 9.92 |
| 0 | 2 | E | 1 | D | 10.28 |
| 0 | 2 | F | 1 | D | 10.28 |
| 0 | 3 | 0 | 1 | E | 10.63 |
| 0 | 3 | 1 | 1 | F | 10.98 |
| 0 | 3 | 2 | 1 | F | 10.96 |
| 0 | 3 | 3 | 2 | 0 | 11.34 |
| 0 | 3 | 4 | 2 | 1 | 11.69 |
| 0 | 3 | 5 | 2 | 1 | 11.69 |
| 0 | 3 | 6 | 2 | 2 | 12.05 |
| 0 | 3 | 7 | 2 | 2 | 12.05 |
| 0 | 3 | 8 | 2 | 3 | 12.40 |
| 0 | 3 | 9 | 2 | 4 | 12.76 |
| 0 | 3 | A | 2 | 4 | 12.76 |
| 0 | 3 | B | 2 | 5 | 13.11 |
| 0 | 3 | C | 2 | 5 | 13.11 |
| 0 | 3 | D | 2 | 6 | 13.46 |
| 0 | 3 | E | 2 | 7 | 13.82 |
| 0 | 3 | F | 2 | 7 | 13.82 |
| 0 | 4 | 0 | 2 | 8 | 14.17 |
| 0 | 4 | 1 | 2 | 8 | 14.17 |
| 0 | 4 | 2 | 2 | 9 | 14.53 |
| 0 | 4 | 3 | 2 | A | 14.88 |
| 0 | 4 | 4 | 2 | A | 14.88 |
| 0 | 4 | 5 | 2 | B | 15.24 |
| 0 | 4 | 6 | 2 | B | 15.24 |
| 0 | 4 | 7 | 2 | C | 15.59 |
| 0 | 4 | 8 | 2 | C | 15.59 |
| 0 | 4 | 9 | 2 | D | 15.94 |

APPENDIX A-continued

| EPROM 36 ADDRESS (HEX) | | | EPROM 36 CONTENTS (HEX) | | BEARING (QUADRANT) (DISPLACEMENT) (ANGLE) |
|---|---|---|---|---|---|
| A8 | A7–A4 | A3–A0 | D7–D4 | D3–D0 | |
| 0 | 4 | A | 2 | E | 16.30 |
| 0 | 4 | B | 2 | E | 16.30 |
| 0 | 4 | C | 2 | F | 16.65 |
| 0 | 4 | D | 2 | F | 16.65 |
| 0 | 4 | E | 3 | 0 | 17.01 |
| 0 | 4 | F | 3 | 1 | 17.36 |
| 0 | 5 | 0 | 3 | 1 | 17.36 |
| 0 | 5 | 1 | 3 | 2 | 17.72 |
| 0 | 5 | 2 | 3 | 2 | 17.72 |
| 0 | 5 | 3 | 3 | 3 | 18.07 |
| 0 | 5 | 4 | 3 | 3 | 18.07 |
| 0 | 5 | 5 | 3 | 4 | 18.43 |
| 0 | 5 | 6 | 3 | 5 | 18.78 |
| 0 | 5 | 7 | 3 | 5 | 18.78 |
| 0 | 5 | 8 | 3 | 6 | 19.13 |
| 0 | 5 | 9 | 3 | 6 | 19.13 |
| 0 | 5 | A | 3 | 7 | 19.49 |
| 0 | 5 | B | 3 | 7 | 19.49 |
| 0 | 5 | C | 3 | 8 | 19.84 |
| 0 | 5 | D | 3 | 9 | 20.20 |
| 0 | 5 | E | 3 | 9 | 20.20 |
| 0 | 5 | F | 3 | A | 20.55 |
| 0 | 6 | 0 | 3 | A | 20.55 |
| 0 | 6 | 1 | 3 | B | 20.91 |
| 0 | 6 | 2 | 3 | B | 20.91 |
| 0 | 6 | 3 | 3 | C | 21.26 |
| 0 | 6 | 4 | 3 | C | 21.26 |
| 0 | 6 | 5 | 3 | D | 21.61 |
| 0 | 6 | 6 | 3 | E | 21.97 |
| 0 | 6 | 7 | 3 | E | 21.97 |
| 0 | 6 | 8 | 3 | F | 22.32 |
| 0 | 6 | 9 | 3 | F | 22.32 |
| 0 | 6 | A | 4 | 0 | 22.68 |
| 0 | 6 | B | 4 | 0 | 22.68 |
| 0 | 6 | C | 4 | 1 | 23.03 |
| 0 | 6 | D | 4 | 1 | 23.03 |
| 0 | 6 | E | 4 | 2 | 23.39 |
| 0 | 6 | F | 4 | 2 | 23.39 |
| 0 | 7 | 0 | 4 | 3 | 23.74 |
| 0 | 7 | 1 | 4 | 3 | 23.74 |
| 0 | 7 | 2 | 4 | 4 | 24.09 |
| 0 | 7 | 3 | 4 | 5 | 24.45 |
| 0 | 7 | 4 | 4 | 5 | 24.45 |
| 0 | 7 | 5 | 4 | 6 | 24.80 |
| 0 | 7 | 6 | 4 | 6 | 24.80 |
| 0 | 7 | 7 | 4 | 7 | 25.16 |
| 0 | 7 | 8 | 4 | 7 | 25.16 |
| 0 | 7 | 9 | 4 | 8 | 25.51 |
| 0 | 7 | A | 4 | 8 | 25.51 |
| 0 | 7 | B | 4 | 9 | 25.87 |
| 0 | 7 | C | 4 | 9 | 25.87 |
| 0 | 7 | D | 4 | A | 26.22 |
| 0 | 7 | E | 4 | A | 26.22 |
| 0 | 7 | F | 4 | B | 26.57 |
| 0 | 8 | 0 | 4 | B | 26.57 |
| 0 | 8 | 1 | 4 | C | 26.93 |
| 0 | 8 | 2 | 4 | C | 26.93 |
| 0 | 8 | 3 | 4 | D | 27.28 |
| 0 | 8 | 4 | 4 | D | 27.28 |
| 0 | 8 | 5 | 4 | E | 27.64 |
| 0 | 8 | 6 | 4 | E | 27.64 |
| 0 | 8 | 7 | 4 | F | 27.99 |
| 0 | 8 | 8 | 4 | F | 27.99 |
| 0 | 8 | 9 | 5 | 0 | 28.35 |
| 0 | 8 | A | 5 | 0 | 28.35 |
| 0 | 8 | B | 5 | 1 | 28.70 |
| 0 | 8 | C | 5 | 1 | 28.70 |
| 0 | 8 | D | 5 | 2 | 29.06 |
| 0 | 8 | E | 5 | 2 | 29.06 |
| 0 | 8 | F | 5 | 3 | 29.41 |
| 0 | 9 | 0 | 5 | 3 | 29.41 |
| 0 | 9 | 1 | 5 | 4 | 29.76 |
| 0 | 9 | 2 | 5 | 4 | 29.76 |
| 0 | 9 | 3 | 5 | 5 | 30.12 |
| 0 | 9 | 4 | 5 | 5 | 30.12 |
| 0 | 9 | 5 | 5 | 6 | 30.47 |
| 0 | 9 | 6 | 5 | 6 | 30.47 |
| 0 | 9 | 7 | 5 | 6 | 30.47 |
| 0 | 9 | 8 | 5 | 7 | 30.83 |
| 0 | 9 | 9 | 5 | 7 | 30.83 |
| 0 | 9 | A | 5 | 8 | 31.16 |
| 0 | 9 | B | 5 | 8 | 31.18 |
| 0 | 9 | C | 5 | 9 | 31.54 |
| 0 | 9 | D | 5 | 9 | 31.54 |
| 0 | 9 | E | 5 | A | 31.89 |
| 0 | 9 | F | 5 | A | 31.89 |
| 0 | A | 0 | 5 | B | 32.24 |
| 0 | A | 1 | 5 | B | 32.24 |
| 0 | A | 2 | 5 | C | 32.60 |
| 0 | A | 3 | 5 | C | 32.60 |
| 0 | A | 4 | 5 | C | 32.60 |
| 0 | A | 5 | 5 | D | 32.95 |
| 0 | A | 6 | 5 | D | 32.95 |
| 0 | A | 7 | 5 | E | 33.31 |
| 0 | A | 8 | 5 | E | 33.31 |
| 0 | A | 9 | 5 | F | 33.66 |
| 0 | A | A | 5 | F | 33.66 |
| 0 | A | B | 6 | 0 | 34.02 |
| 0 | A | C | 6 | 0 | 34.02 |
| 0 | A | D | 6 | 0 | 34.02 |
| 0 | A | E | 6 | 1 | 34.37 |
| 0 | A | F | 6 | 1 | 34.37 |
| 0 | B | 0 | 6 | 2 | 34.72 |
| 0 | B | 1 | 6 | 2 | 34.72 |
| 0 | B | 2 | 6 | 3 | 35.08 |
| 0 | B | 3 | 6 | 3 | 35.08 |
| 0 | B | 4 | 6 | 3 | 35.08 |
| 0 | B | 5 | 6 | 4 | 35.43 |
| 0 | B | 6 | 6 | 4 | 35.43 |
| 0 | B | 7 | 6 | 5 | 35.79 |
| 0 | B | 8 | 6 | 5 | 35.79 |
| 0 | B | 9 | 6 | 5 | 35.79 |
| 0 | B | A | 6 | 6 | 36.14 |
| 0 | B | B | 6 | 6 | 36.14 |
| 0 | B | C | 6 | 7 | 36.50 |
| 0 | B | D | 6 | 7 | 36.50 |
| 0 | B | E | 6 | 8 | 36.85 |
| 0 | B | F | 6 | 8 | 36.85 |
| 0 | C | 0 | 6 | 8 | 36.85 |
| 0 | C | 1 | 6 | 9 | 37.20 |
| 0 | C | 2 | 6 | 9 | 37.20 |
| 0 | C | 3 | 6 | A | 37.56 |
| 0 | C | 4 | 6 | A | 37.56 |
| 0 | C | 5 | 6 | A | 37.56 |
| 0 | C | 6 | 6 | B | 37.91 |
| 0 | C | 7 | 6 | B | 37.91 |
| 0 | C | 8 | 6 | C | 38.27 |
| 0 | C | 9 | 6 | C | 38.27 |
| 0 | C | A | 6 | C | 38.27 |
| 0 | C | B | 6 | D | 38.62 |
| 0 | C | C | 6 | D | 38.62 |
| 0 | C | D | 6 | D | 38.62 |
| 0 | C | E | 6 | E | 38.98 |
| 0 | C | F | 6 | E | 38.98 |
| 0 | D | 0 | 6 | F | 39.33 |
| 0 | D | 1 | 6 | F | 39.33 |
| 0 | D | 2 | 6 | F | 39.33 |
| 0 | D | 3 | 7 | 0 | 39.69 |
| 0 | D | 4 | 7 | 0 | 39.69 |
| 0 | D | 5 | 7 | 1 | 40.04 |
| 0 | D | 6 | 7 | 1 | 40.04 |
| 0 | D | 7 | 7 | 1 | 40.04 |
| 0 | D | 8 | 7 | 2 | 40.39 |
| 0 | D | 9 | 7 | 2 | 40.39 |
| 0 | D | A | 7 | 2 | 40.39 |
| 0 | D | B | 7 | 3 | 40.75 |
| 0 | D | C | 7 | 3 | 40.75 |
| 0 | D | D | 7 | 3 | 40.75 |
| 0 | D | E | 7 | 4 | 41.10 |
| 0 | D | F | 7 | 4 | 41.10 |
| 0 | E | 0 | 7 | 5 | 41.46 |
| 0 | E | 1 | 7 | 5 | 41.46 |
| 0 | E | 2 | 7 | 5 | 41.46 |
| 0 | E | 3 | 7 | 6 | 41.81 |

APPENDIX A-continued

| EPROM 36 ADDRESS (HEX) | | | EPROM 36 CONTENTS (HEX) | | BEARING (QUADRANT) (DISPLACEMENT) |
|---|---|---|---|---|---|
| A8 | A7-A4 | A3-A0 | D7-D4 | D3-D0 | (ANGLE) |
| 0 | E | 4 | 7 | 6 | 41.81 |
| 0 | E | 5 | 7 | 6 | 41.81 |
| 0 | E | 6 | 7 | 7 | 42.17 |
| 0 | E | 7 | 7 | 7 | 42.17 |
| 0 | E | 8 | 7 | 7 | 42.17 |
| 0 | E | 9 | 7 | 8 | 42.52 |
| 0 | E | A | 7 | 8 | 42.52 |
| 0 | E | B | 7 | 8 | 42.52 |
| 0 | E | C | 7 | 9 | 42.87 |
| 0 | E | D | 7 | 9 | 42.87 |
| 0 | E | E | 7 | 9 | 42.87 |
| 0 | E | F | 7 | A | 43.23 |
| 0 | F | 0 | 7 | A | 43.23 |
| 0 | F | 1 | 7 | A | 43.23 |
| 0 | F | 2 | 7 | B | 43.58 |
| 0 | F | 3 | 7 | B | 43.58 |
| 0 | F | 4 | 7 | B | 43.58 |
| 0 | F | 5 | 7 | C | 43.94 |
| 0 | F | 6 | 7 | C | 43.94 |
| 0 | F | 7 | 7 | C | 43.94 |
| 0 | F | 8 | 7 | D | 44.29 |
| 0 | F | 9 | 7 | D | 44.29 |
| 0 | F | A | 7 | D | 44.29 |
| 0 | F | B | 7 | E | 44.65 |
| 0 | F | C | 7 | E | 44.65 |
| 0 | F | D | 7 | E | 44.65 |
| 0 | F | E | 7 | F | 45.00 |
| 0 | F | F | 7 | F | 45.00 |
| 1 | 0 | 0 | F | F | 90.00 |
| 1 | 0 | 1 | F | E | 89.65 |
| 1 | 0 | 2 | F | E | 89.65 |
| 1 | 0 | 3 | F | D | 89.29 |
| 1 | 0 | 4 | F | C | 88.94 |
| 1 | 0 | 5 | F | C | 88.94 |
| 1 | 0 | 6 | F | B | 88.58 |
| 1 | 0 | 7 | F | B | 88.58 |
| 1 | 0 | 8 | F | A | 88.23 |
| 1 | 0 | 9 | F | 9 | 87.87 |
| 1 | 0 | A | F | 9 | 87.87 |
| 1 | 0 | B | F | 8 | 87.52 |
| 1 | 0 | C | F | 7 | 87.17 |
| 1 | 0 | D | F | 7 | 87.17 |
| 1 | 0 | E | F | 6 | 86.81 |
| 1 | 0 | F | F | 5 | 86.46 |
| 1 | 1 | 0 | F | 5 | 86.46 |
| 1 | 1 | 1 | F | 4 | 86.10 |
| 1 | 1 | 2 | F | 4 | 86.10 |
| 1 | 1 | 3 | F | 3 | 85.75 |
| 1 | 1 | 4 | F | 2 | 85.39 |
| 1 | 1 | 5 | F | 2 | 85.39 |
| 1 | 1 | 6 | F | 1 | 85.04 |
| 1 | 1 | 7 | F | 0 | 84.69 |
| 1 | 1 | 8 | F | 0 | 84.69 |
| 1 | 1 | 9 | E | F | 84.33 |
| 1 | 1 | A | E | F | 84.33 |
| 1 | 1 | B | E | E | 83.98 |
| 1 | 1 | C | E | D | 83.62 |
| 1 | 1 | D | E | D | 83.62 |
| 1 | 1 | E | E | C | 83.27 |
| 1 | 1 | F | E | B | 82.91 |
| 1 | 2 | 0 | E | B | 82.91 |
| 1 | 2 | 1 | E | A | 82.56 |
| 1 | 2 | 2 | E | A | 82.56 |
| 1 | 2 | 3 | E | 9 | 82.20 |
| 1 | 2 | 4 | E | 8 | 81.85 |
| 1 | 2 | 5 | E | 8 | 81.85 |
| 1 | 2 | 6 | E | 7 | 81.50 |
| 1 | 2 | 7 | E | 6 | 81.14 |
| 1 | 2 | 8 | E | 6 | 81.14 |
| 1 | 2 | 9 | E | 5 | 80.79 |
| 1 | 2 | A | E | 5 | 80.79 |
| 1 | 2 | B | E | 4 | 80.43 |
| 1 | 2 | C | E | 3 | 80.08 |
| 1 | 2 | D | E | 3 | 80.08 |
| 1 | 2 | E | E | 2 | 79.72 |
| 1 | 2 | F | E | 2 | 79.72 |
| 1 | 3 | 0 | E | 1 | 79.37 |
| 1 | 3 | 1 | E | 0 | 79.02 |
| 1 | 3 | 2 | E | 0 | 79.02 |
| 1 | 3 | 3 | D | F | 78.66 |
| 1 | 3 | 4 | D | E | 78.31 |
| 1 | 3 | 5 | D | E | 78.31 |
| 1 | 3 | 6 | D | D | 77.95 |
| 1 | 3 | 7 | D | D | 77.95 |
| 1 | 3 | 8 | D | C | 77.60 |
| 1 | 3 | 9 | D | B | 77.24 |
| 1 | 3 | A | D | B | 77.24 |
| 1 | 3 | B | D | A | 76.89 |
| 1 | 3 | C | D | A | 76.89 |
| 1 | 3 | D | D | 9 | 76.54 |
| 1 | 3 | E | D | 8 | 76.18 |
| 1 | 3 | F | D | 8 | 76.18 |
| 1 | 4 | 0 | D | 7 | 75.83 |
| 1 | 4 | 1 | D | 7 | 75.83 |
| 1 | 4 | 2 | D | 6 | 75.47 |
| 1 | 4 | 3 | D | 5 | 75.12 |
| 1 | 4 | 4 | D | 5 | 75.12 |
| 1 | 4 | 5 | D | 4 | 74.76 |
| 1 | 4 | 6 | D | 4 | 74.76 |
| 1 | 4 | 7 | D | 3 | 74.41 |
| 1 | 4 | 8 | D | 3 | 74.41 |
| 1 | 4 | 9 | D | 2 | 74.06 |
| 1 | 4 | A | D | 1 | 73.70 |
| 1 | 4 | B | D | 1 | 73.70 |
| 1 | 4 | C | D | 0 | 73.35 |
| 1 | 4 | D | D | 0 | 73.35 |
| 1 | 4 | E | C | F | 72.99 |
| 1 | 4 | F | C | E | 72.64 |
| 1 | 5 | 0 | C | E | 72.64 |
| 1 | 5 | 1 | C | D | 72.28 |
| 1 | 5 | 2 | C | D | 72.28 |
| 1 | 5 | 3 | C | C | 71.93 |
| 1 | 5 | 4 | C | C | 71.93 |
| 1 | 5 | 5 | C | B | 71.57 |
| 1 | 5 | 6 | C | A | 71.22 |
| 1 | 5 | 7 | C | A | 71.22 |
| 1 | 5 | 8 | C | 9 | 70.87 |
| 1 | 5 | 9 | C | 9 | 70.87 |
| 1 | 5 | A | C | 8 | 70.51 |
| 1 | 5 | B | C | 8 | 70.51 |
| 1 | 5 | C | C | 7 | 70.16 |
| 1 | 5 | D | C | 6 | 69.80 |
| 1 | 5 | E | C | 6 | 69.80 |
| 1 | 5 | F | C | 5 | 69.45 |
| 1 | 6 | 0 | C | 5 | 69.45 |
| 1 | 6 | 1 | C | 4 | 69.09 |
| 1 | 6 | 2 | C | 4 | 69.09 |
| 1 | 6 | 3 | C | 3 | 68.74 |
| 1 | 6 | 4 | C | 3 | 68.74 |
| 1 | 6 | 5 | C | 2 | 68.39 |
| 1 | 6 | 6 | C | 1 | 68.03 |
| 1 | 6 | 7 | C | 1 | 68.03 |
| 1 | 6 | 8 | C | 0 | 67.68 |
| 1 | 6 | 9 | C | 0 | 67.68 |
| 1 | 6 | A | B | F | 67.32 |
| 1 | 6 | B | B | F | 67.32 |
| 1 | 6 | C | B | E | 66.97 |
| 1 | 6 | D | B | E | 66.97 |
| 1 | 6 | E | B | D | 66.61 |
| 1 | 6 | F | B | D | 66.61 |
| 1 | 7 | 0 | B | C | 66.26 |
| 1 | 7 | 1 | B | C | 66.26 |
| 1 | 7 | 2 | B | B | 65.91 |
| 1 | 7 | 3 | B | A | 65.55 |
| 1 | 7 | 4 | B | A | 65.55 |
| 1 | 7 | 5 | B | 9 | 65.20 |
| 1 | 7 | 6 | B | 9 | 65.20 |
| 1 | 7 | 7 | B | 8 | 64.84 |
| 1 | 7 | 8 | B | 8 | 64.84 |
| 1 | 7 | 9 | B | 7 | 64.49 |
| 1 | 7 | A | B | 7 | 64.49 |
| 1 | 7 | B | B | 6 | 64.13 |
| 1 | 7 | C | B | 6 | 64.13 |
| 1 | 7 | D | B | 5 | 63.78 |

APPENDIX A-continued

| EPROM 36 ADDRESS (HEX) | | EPROM 36 CONTENTS (HEX) | | BEARING (QUADRANT) (DISPLACEMENT) (ANGLE) |
|---|---|---|---|---|
| A8 | A7–A4 A3–A0 | D7–D4 | D3–D0 | |
| 1 | 7 E | B | 5 | 63.78 |
| 1 | 7 F | B | 4 | 63.43 |
| 1 | 8 0 | B | 4 | 63.43 |
| 1 | 8 1 | B | 3 | 63.07 |
| 1 | 8 2 | B | 3 | 63.07 |
| 1 | 8 3 | B | 2 | 62.72 |
| 1 | 8 4 | B | 2 | 62.72 |
| 1 | 8 5 | B | 1 | 62.36 |
| 1 | 8 6 | B | 1 | 62.36 |
| 1 | 8 7 | B | 0 | 62.01 |
| 1 | 8 8 | B | 0 | 62.01 |
| 1 | 8 9 | A | F | 61.65 |
| 1 | 8 A | A | F | 61.65 |
| 1 | 8 B | A | E | 61.30 |
| 1 | 8 C | A | E | 61.30 |
| 1 | 8 D | A | D | 60.94 |
| 1 | 8 E | A | D | 60.94 |
| 1 | 8 F | A | C | 60.59 |
| 1 | 9 0 | A | C | 60.59 |
| 1 | 9 1 | A | B | 60.24 |
| 1 | 9 2 | A | B | 60.24 |
| 1 | 9 3 | A | A | 59.88 |
| 1 | 9 4 | A | A | 59.88 |
| 1 | 9 5 | A | 9 | 59.53 |
| 1 | 9 6 | A | 9 | 59.53 |
| 1 | 9 7 | A | 9 | 59.53 |
| 1 | 9 8 | A | 8 | 59.17 |
| 1 | 9 9 | A | 8 | 59.17 |
| 1 | 9 A | A | 7 | 58.82 |
| 1 | 9 B | A | 7 | 58.82 |
| 1 | 9 C | A | 6 | 58.46 |
| 1 | 9 D | A | 6 | 58.46 |
| 1 | 9 E | A | 5 | 58.11 |
| 1 | 9 F | A | 5 | 58.11 |
| 1 | A 0 | A | 4 | 57.76 |
| 1 | A 1 | A | 4 | 57.76 |
| 1 | A 2 | A | 3 | 57.40 |
| 1 | A 3 | A | 3 | 57.40 |
| 1 | A 4 | A | 3 | 57.40 |
| 1 | A 5 | A | 2 | 57.05 |
| 1 | A 6 | A | 2 | 57.05 |
| 1 | A 7 | A | 1 | 56.69 |
| 1 | A 8 | A | 1 | 56.69 |
| 1 | A 9 | A | 0 | 56.34 |
| 1 | A A | A | 0 | 56.34 |
| 1 | A B | 9 | F | 55.98 |
| 1 | A C | 9 | F | 55.98 |
| 1 | A D | 9 | F | 55.98 |
| 1 | A E | 9 | E | 55.63 |
| 1 | A F | 9 | E | 55.63 |
| 1 | B 0 | 9 | D | 55.28 |
| 1 | B 1 | 9 | D | 55.28 |
| 1 | B 2 | 9 | C | 54.92 |
| 1 | B 3 | 9 | C | 54.92 |
| 1 | B 4 | 9 | C | 54.92 |
| 1 | B 5 | 9 | B | 54.57 |
| 1 | B 6 | 9 | B | 54.57 |
| 1 | B 7 | 9 | A | 54.21 |
| 1 | B 8 | 9 | A | 54.21 |
| 1 | B 9 | 9 | A | 54.21 |
| 1 | B A | 9 | 9 | 53.86 |
| 1 | B B | 9 | 9 | 53.86 |
| 1 | B C | 9 | 8 | 53.50 |
| 1 | B D | 9 | 8 | 53.50 |
| 1 | B E | 9 | 7 | 53.15 |
| 1 | B F | 9 | 7 | 53.15 |
| 1 | C 0 | 9 | 7 | 53.15 |
| 1 | C 1 | 9 | 6 | 52.80 |
| 1 | C 2 | 9 | 6 | 52.80 |
| 1 | C 3 | 9 | 5 | 52.44 |
| 1 | C 4 | 9 | 5 | 52.44 |
| 1 | C 5 | 9 | 5 | 52.44 |
| 1 | C 6 | 9 | 4 | 52.09 |
| 1 | C 7 | 9 | 4 | 52.09 |
| 1 | C 8 | 9 | 3 | 51.73 |
| 1 | C 9 | 9 | 3 | 51.73 |
| 1 | C A | 9 | 3 | 51.73 |
| 1 | C B | 9 | 2 | 51.38 |
| 1 | C C | 9 | 2 | 51.38 |
| 1 | C D | 9 | 2 | 51.38 |
| 1 | C E | 9 | 1 | 51.02 |
| 1 | C F | 9 | 1 | 51.02 |
| 1 | D 0 | 9 | 0 | 50.67 |
| 1 | D 1 | 9 | 0 | 50.67 |
| 1 | D 2 | 9 | 0 | 50.67 |
| 1 | D 3 | 8 | F | 50.31 |
| 1 | D 4 | 8 | F | 50.31 |
| 1 | D 5 | 8 | E | 49.96 |
| 1 | D 6 | 8 | E | 49.96 |
| 1 | D 7 | 8 | E | 49.96 |
| 1 | D 8 | 8 | D | 49.61 |
| 1 | D 9 | 8 | D | 49.61 |
| 1 | D A | 8 | D | 49.61 |
| 1 | D B | 8 | C | 49.25 |
| 1 | D C | 8 | C | 49.25 |
| 1 | D D | 8 | C | 49.25 |
| 1 | D E | 8 | B | 48.90 |
| 1 | D F | 8 | B | 48.90 |
| 1 | E 0 | 8 | A | 48.54 |
| 1 | E 1 | 8 | A | 48.54 |
| 1 | E 2 | 8 | A | 48.54 |
| 1 | E 3 | 8 | 9 | 48.19 |
| 1 | E 4 | 8 | 9 | 48.19 |
| 1 | E 5 | 8 | 9 | 48.19 |
| 1 | E 6 | 8 | 8 | 47.83 |
| 1 | E 7 | 8 | 8 | 47.83 |
| 1 | E 8 | 8 | 8 | 47.83 |
| 1 | E 9 | 8 | 7 | 47.48 |
| 1 | E A | 8 | 7 | 47.48 |
| 1 | E B | 8 | 7 | 47.48 |
| 1 | E C | 8 | 6 | 47.13 |
| 1 | E D | 8 | 6 | 47.13 |
| 1 | E E | 8 | 6 | 47.13 |
| 1 | E F | 8 | 5 | 46.77 |
| 1 | F 0 | 8 | 5 | 46.77 |
| 1 | F 1 | 8 | 5 | 46.77 |
| 1 | F 2 | 8 | 4 | 46.42 |
| 1 | F 3 | 8 | 4 | 46.42 |
| 1 | F 4 | 8 | 4 | 46.42 |
| 1 | F 5 | 8 | 3 | 46.06 |
| 1 | F 6 | 8 | 3 | 46.06 |
| 1 | F 7 | 8 | 3 | 46.06 |
| 1 | F 8 | 8 | 2 | 45.71 |
| 1 | F 9 | 8 | 2 | 45.71 |
| 1 | F A | 8 | 2 | 45.71 |
| 1 | F B | 8 | 1 | 45.35 |
| 1 | F C | 8 | 1 | 45.35 |
| 1 | F D | 8 | 1 | 45.35 |
| 1 | F E | 8 | 0 | 45.00 |
| 1 | F F | 8 | 0 | 45.00 |

APPENDIX B

| EPROMS 50 & 52 ADDRESS (HEX) | | EPROM 50 CONTENTS (HEX) | | EPROM 58 CONTENTS (HEX) | | BEARING (QUADRANT) (DISPLACEMENT) (ANGLE) |
|---|---|---|---|---|---|---|
| A8 | A7–A4 A3–A0 | D7–D4 | D3–D0 | D7–D4 | D3–D0 | |
| 0 | 0 0 | 0 | 0 | 0 | 0 | 0 |
| 0 | 0 1 | 0 | 0 | 0 | 0 | 0 |
| 0 | 0 2 | 0 | 0 | 0 | 0 | 0 |
| 0 | 0 3 | 0 | 1 | 0 | 1 | 1 |
| 0 | 0 4 | 0 | 1 | 0 | 1 | 1 |
| 0 | 0 5 | 0 | 1 | 0 | 1 | 1 |
| 0 | 0 6 | 0 | 1 | 0 | 1 | 1 |
| 0 | 0 7 | 0 | 2 | 0 | 2 | 2 |
| 0 | 0 8 | 0 | 2 | 0 | 2 | 2 |
| 0 | 0 9 | 0 | 2 | 0 | 2 | 2 |
| 0 | 0 A | 0 | 2 | 0 | 2 | 2 |
| 0 | 0 B | 0 | 2 | 0 | 2 | 2 |
| 0 | 0 C | 0 | 3 | 0 | 3 | 3 |

APPENDIX B-continued

| EPROMS 50 & 52 ADDRESS (HEX) | | | EPROM 50 CONTENTS (HEX) | | EPROM 58 CONTENTS (HEX) | | BEARING (QUADRANT) (DISPLACEMENT) (ANGLE) |
|---|---|---|---|---|---|---|---|
| A8 | A7-A4 | A3-A0 | D7-D4 | D3-D0 | D7-D4 | D3-D0 | |
| 0 | 0 | D | 0 | 3 | 0 | 3 | 3 |
| 0 | 0 | E | 0 | 3 | 0 | 3 | 3 |
| 0 | 0 | F | 0 | 3 | 0 | 3 | 3 |
| 0 | 1 | 0 | 0 | 4 | 0 | 4 | 4 |
| 0 | 1 | 1 | 0 | 4 | 0 | 4 | 4 |
| 0 | 1 | 2 | 0 | 4 | 0 | 4 | 4 |
| 0 | 1 | 3 | 0 | 4 | 0 | 4 | 4 |
| 0 | 1 | 4 | 0 | 4 | 0 | 4 | 4 |
| 0 | 1 | 5 | 0 | 5 | 0 | 5 | 5 |
| 0 | 1 | 6 | 0 | 5 | 0 | 5 | 5 |
| 0 | 1 | 7 | 0 | 5 | 0 | 5 | 5 |
| 0 | 1 | 8 | 0 | 5 | 0 | 5 | 5 |
| 0 | 1 | 9 | 0 | 6 | 0 | 6 | 6 |
| 0 | 1 | A | 0 | 6 | 0 | 6 | 6 |
| 0 | 1 | B | 0 | 6 | 0 | 6 | 6 |
| 0 | 1 | C | 0 | 6 | 0 | 6 | 6 |
| 0 | 1 | D | 0 | 6 | 0 | 6 | 6 |
| 0 | 1 | E | 0 | 7 | 0 | 7 | 7 |
| 0 | 1 | F | 0 | 7 | 0 | 7 | 7 |
| 0 | 2 | 0 | 0 | 7 | 0 | 7 | 7 |
| 0 | 2 | 1 | 0 | 7 | 0 | 7 | 7 |
| 0 | 2 | 2 | 0 | 8 | 0 | 8 | 8 |
| 0 | 2 | 3 | 0 | 8 | 0 | 8 | 8 |
| 0 | 2 | 4 | 0 | 8 | 0 | 8 | 8 |
| 0 | 2 | 5 | 0 | 8 | 0 | 8 | 8 |
| 0 | 2 | 6 | 0 | 8 | 0 | 8 | 8 |
| 0 | 2 | 7 | 0 | 9 | 0 | 9 | 9 |
| 0 | 2 | 8 | 0 | 9 | 0 | 9 | 9 |
| 0 | 2 | 9 | 0 | 9 | 0 | 9 | 9 |
| 0 | 2 | A | 0 | 9 | 0 | 9 | 9 |
| 0 | 2 | B | 0 | A | 1 | 0 | 10 |
| 0 | 2 | C | 0 | A | 1 | 0 | 10 |
| 0 | 2 | D | 0 | A | 1 | 0 | 10 |
| 0 | 2 | E | 0 | A | 1 | 0 | 10 |
| 0 | 2 | F | 0 | A | 1 | 0 | 10 |
| 0 | 3 | 0 | 0 | B | 1 | 1 | 11 |
| 0 | 3 | 1 | 0 | B | 1 | 1 | 11 |
| 0 | 3 | 2 | 0 | B | 1 | 1 | 11 |
| 0 | 3 | 3 | 0 | B | 1 | 1 | 11 |
| 0 | 3 | 4 | 0 | C | 1 | 2 | 12 |
| 0 | 3 | 5 | 0 | C | 1 | 2 | 12 |
| 0 | 3 | 6 | 0 | C | 1 | 2 | 12 |
| 0 | 3 | 7 | 0 | C | 1 | 2 | 12 |
| 0 | 3 | 8 | 0 | C | 1 | 2 | 12 |
| 0 | 3 | 9 | 0 | D | 1 | 3 | 13 |
| 0 | 3 | A | 0 | D | 1 | 3 | 13 |
| 0 | 3 | B | 0 | D | 1 | 3 | 13 |
| 0 | 3 | C | 0 | D | 1 | 3 | 13 |
| 0 | 3 | D | 0 | D | 1 | 3 | 13 |
| 0 | 3 | E | 0 | E | 1 | 4 | 14 |
| 0 | 3 | F | 0 | E | 1 | 4 | 14 |
| 0 | 4 | 0 | 0 | E | 1 | 4 | 14 |
| 0 | 4 | 1 | 0 | E | 1 | 4 | 14 |
| 0 | 4 | 2 | 0 | F | 1 | 5 | 15 |
| 0 | 4 | 3 | 0 | F | 1 | 5 | 15 |
| 0 | 4 | 4 | 0 | F | 1 | 5 | 15 |
| 0 | 4 | 5 | 0 | F | 1 | 5 | 15 |
| 0 | 4 | 6 | 0 | F | 1 | 5 | 15 |
| 0 | 4 | 7 | 1 | 0 | 1 | 6 | 16 |
| 0 | 4 | 8 | 1 | 0 | 1 | 6 | 16 |
| 0 | 4 | 9 | 1 | 0 | 1 | 6 | 16 |
| 0 | 4 | A | 1 | 0 | 1 | 6 | 16 |
| 0 | 4 | B | 1 | 0 | 1 | 6 | 16 |
| 0 | 4 | C | 1 | 1 | 1 | 7 | 17 |
| 0 | 4 | D | 1 | 1 | 1 | 7 | 17 |
| 0 | 4 | E | 1 | 1 | 1 | 7 | 17 |
| 0 | 4 | F | 1 | 1 | 1 | 7 | 17 |
| 0 | 5 | 0 | 1 | 1 | 1 | 7 | 17 |
| 0 | 5 | 1 | 1 | 2 | 1 | 8 | 18 |
| 0 | 5 | 2 | 1 | 2 | 1 | 8 | 18 |
| 0 | 5 | 3 | 1 | 2 | 1 | 8 | 18 |
| 0 | 5 | 4 | 1 | 2 | 1 | 8 | 18 |
| 0 | 5 | 5 | 1 | 2 | 1 | 8 | 18 |
| 0 | 5 | 6 | 1 | 3 | 1 | 9 | 19 |
| 0 | 5 | 7 | 1 | 3 | 1 | 9 | 19 |
| 0 | 5 | 8 | 1 | 3 | 1 | 9 | 19 |
| 0 | 5 | 9 | 1 | 3 | 1 | 9 | 19 |
| 0 | 5 | A | 1 | 3 | 1 | 9 | 19 |
| 0 | 5 | B | 1 | 4 | 2 | 0 | 20 |
| 0 | 5 | C | 1 | 4 | 2 | 0 | 20 |
| 0 | 5 | D | 1 | 4 | 2 | 0 | 20 |
| 0 | 5 | E | 1 | 4 | 2 | 0 | 20 |
| 0 | 5 | F | 1 | 4 | 2 | 0 | 20 |
| 0 | 6 | 0 | 1 | 5 | 2 | 1 | 21 |
| 0 | 6 | 1 | 1 | 5 | 2 | 1 | 21 |
| 0 | 6 | 2 | 1 | 5 | 2 | 1 | 21 |
| 0 | 6 | 3 | 1 | 5 | 2 | 1 | 21 |
| 0 | 6 | 4 | 1 | 5 | 2 | 1 | 21 |
| 0 | 6 | 5 | 1 | 6 | 2 | 2 | 22 |
| 0 | 6 | 6 | 1 | 6 | 2 | 2 | 22 |
| 0 | 6 | 7 | 1 | 6 | 2 | 2 | 22 |
| 0 | 6 | 8 | 1 | 6 | 2 | 2 | 22 |
| 0 | 6 | 9 | 1 | 6 | 2 | 2 | 22 |
| 0 | 6 | A | 1 | 7 | 2 | 3 | 23 |
| 0 | 6 | B | 1 | 7 | 2 | 3 | 23 |
| 0 | 6 | C | 1 | 7 | 2 | 3 | 23 |
| 0 | 6 | D | 1 | 7 | 2 | 3 | 23 |
| 0 | 6 | E | 1 | 7 | 2 | 3 | 23 |
| 0 | 6 | F | 1 | 8 | 2 | 4 | 24 |
| 0 | 7 | 0 | 1 | 8 | 2 | 4 | 24 |
| 0 | 7 | 1 | 1 | 8 | 2 | 4 | 24 |
| 0 | 7 | 2 | 1 | 8 | 2 | 4 | 24 |
| 0 | 7 | 3 | 1 | 8 | 2 | 4 | 24 |
| 0 | 7 | 4 | 1 | 8 | 2 | 4 | 24 |
| 0 | 7 | 5 | 1 | 9 | 2 | 5 | 25 |
| 0 | 7 | 6 | 1 | 9 | 2 | 5 | 25 |
| 0 | 7 | 7 | 1 | 9 | 2 | 5 | 25 |
| 0 | 7 | 8 | 1 | 9 | 2 | 5 | 25 |
| 0 | 7 | 9 | 1 | 9 | 2 | 5 | 25 |
| 0 | 7 | A | 1 | A | 2 | 6 | 26 |
| 0 | 7 | B | 1 | A | 2 | 6 | 26 |
| 0 | 7 | C | 1 | A | 2 | 6 | 26 |
| 0 | 7 | D | 1 | A | 2 | 6 | 26 |
| 0 | 7 | E | 1 | A | 2 | 6 | 26 |
| 0 | 7 | F | 1 | A | 2 | 6 | 26 |
| 0 | 8 | 0 | 1 | B | 2 | 7 | 27 |
| 0 | 8 | 1 | 1 | B | 2 | 7 | 27 |
| 0 | 8 | 2 | 1 | B | 2 | 7 | 27 |
| 0 | 8 | 3 | 1 | B | 2 | 7 | 27 |
| 0 | 8 | 4 | 1 | B | 2 | 7 | 27 |
| 0 | 8 | 5 | 1 | C | 2 | 8 | 28 |
| 0 | 8 | 6 | 1 | C | 2 | 8 | 28 |
| 0 | 8 | 7 | 1 | C | 2 | 8 | 28 |
| 0 | 8 | 8 | 1 | C | 2 | 8 | 28 |
| 0 | 8 | 9 | 1 | C | 2 | 8 | 28 |
| 0 | 8 | A | 1 | C | 2 | 8 | 28 |
| 0 | 8 | B | 1 | D | 2 | 9 | 29 |
| 0 | 8 | C | 1 | D | 2 | 9 | 29 |
| 0 | 8 | D | 1 | D | 2 | 9 | 29 |
| 0 | 8 | E | 1 | D | 2 | 9 | 29 |
| 0 | 8 | F | 1 | D | 2 | 9 | 29 |
| 0 | C | 0 | 2 | 5 | 3 | 7 | 37 |
| 0 | C | 1 | 2 | 5 | 3 | 7 | 37 |
| 0 | C | 2 | 2 | 5 | 3 | 7 | 37 |
| 0 | C | 3 | 2 | 5 | 3 | 7 | 37 |
| 0 | C | 4 | 2 | 6 | 3 | 8 | 38 |
| 0 | C | 5 | 2 | 6 | 3 | 8 | 38 |
| 0 | C | 6 | 2 | 6 | 3 | 8 | 38 |
| 0 | C | 7 | 2 | 6 | 3 | 8 | 38 |
| 0 | C | 8 | 2 | 6 | 3 | 8 | 38 |
| 0 | C | 9 | 2 | 6 | 3 | 8 | 38 |
| 0 | C | A | 2 | 6 | 3 | 8 | 38 |
| 0 | C | B | 2 | 7 | 3 | 9 | 39 |
| 0 | C | C | 2 | 7 | 3 | 9 | 39 |
| 0 | C | D | 2 | 7 | 3 | 9 | 39 |
| 0 | C | E | 2 | 7 | 3 | 9 | 39 |
| 0 | C | F | 2 | 7 | 3 | 9 | 39 |
| 0 | D | 0 | 2 | 7 | 3 | 9 | 39 |
| 0 | D | 1 | 2 | 7 | 3 | 9 | 39 |
| 0 | D | 2 | 2 | 7 | 3 | 9 | 39 |

APPENDIX B-continued

| EPROMS 50 & 52 ADDRESS (HEX) | | | EPROM 50 CONTENTS (HEX) | | EPROM 58 CONTENTS (HEX) | | BEARING (QUADRANT) (DISPLACEMENT) (ANGLE) |
|---|---|---|---|---|---|---|---|
| A8 | A7-A4 | A3-A0 | D7-D4 | D3-D0 | D7-D4 | D3-D0 | |
| 0 | D | 3 | 2 | 8 | 4 | 0 | 40 |
| 0 | D | 4 | 2 | 8 | 4 | 0 | 40 |
| 0 | D | 5 | 2 | 8 | 4 | 0 | 40 |
| 0 | D | 6 | 2 | 8 | 4 | 0 | 40 |
| 0 | D | 7 | 2 | 8 | 4 | 0 | 40 |
| 0 | D | 8 | 2 | 8 | 4 | 0 | 40 |
| 0 | D | 9 | 2 | 8 | 4 | 0 | 40 |
| 0 | D | A | 2 | 9 | 4 | 1 | 41 |
| 0 | D | B | 2 | 9 | 4 | 1 | 41 |
| 0 | D | C | 2 | 9 | 4 | 1 | 41 |
| 0 | D | D | 2 | 9 | 4 | 1 | 41 |
| 0 | D | E | 2 | 9 | 4 | 1 | 41 |
| 0 | D | F | 2 | 9 | 4 | 1 | 41 |
| 0 | E | 0 | 2 | 9 | 4 | 1 | 41 |
| 0 | E | 1 | 2 | 9 | 4 | 1 | 41 |
| 0 | E | 2 | 2 | A | 4 | 2 | 42 |
| 0 | E | 3 | 2 | A | 4 | 2 | 42 |
| 0 | E | 4 | 2 | A | 4 | 2 | 42 |
| 0 | E | 5 | 2 | A | 4 | 2 | 42 |
| 0 | E | 6 | 2 | A | 4 | 2 | 42 |
| 0 | E | 7 | 2 | A | 4 | 2 | 42 |
| 0 | E | 8 | 2 | A | 4 | 2 | 42 |
| 0 | E | 9 | 2 | A | 4 | 2 | 42 |
| 0 | E | A | 2 | B | 4 | 3 | 43 |
| 0 | E | B | 2 | B | 4 | 3 | 43 |
| 0 | E | C | 2 | B | 4 | 3 | 43 |
| 0 | E | D | 2 | B | 4 | 3 | 43 |
| 0 | E | E | 2 | B | 4 | 3 | 43 |
| 0 | E | F | 2 | B | 4 | 3 | 43 |
| 0 | F | 0 | 2 | B | 4 | 3 | 43 |
| 0 | F | 1 | 2 | B | 4 | 3 | 43 |
| 0 | F | 2 | 2 | C | 4 | 4 | 44 |
| 0 | F | 3 | 2 | C | 4 | 4 | 44 |
| 0 | F | 4 | 2 | C | 4 | 4 | 44 |
| 0 | F | 5 | 2 | C | 4 | 4 | 44 |
| 0 | F | 6 | 2 | C | 4 | 4 | 44 |
| 0 | F | 7 | 2 | C | 4 | 4 | 44 |
| 0 | F | 8 | 2 | C | 4 | 4 | 44 |
| 0 | F | 9 | 2 | C | 4 | 4 | 44 |
| 0 | F | A | 2 | C | 4 | 4 | 44 |
| 0 | F | B | 2 | D | 4 | 5 | 45 |
| 0 | F | C | 2 | D | 4 | 5 | 45 |
| 0 | F | D | 2 | D | 4 | 5 | 45 |
| 0 | F | E | 2 | D | 4 | 5 | 45 |
| 0 | F | F | 2 | D | 4 | 5 | 45 |
| 1 | 0 | 0 | D | A | 9 | 0 | 90 |
| 1 | 0 | 1 | D | A | 9 | 0 | 90 |
| 1 | 0 | 2 | D | A | 9 | 0 | 90 |
| 1 | 0 | 3 | D | 9 | 8 | 9 | 89 |
| 1 | 0 | 4 | D | 9 | 8 | 9 | 89 |
| 1 | 0 | 5 | D | 9 | 8 | 9 | 89 |
| 1 | 0 | 6 | D | 9 | 8 | 9 | 89 |
| 1 | 0 | 7 | D | 8 | 8 | 8 | 88 |
| 1 | 0 | 8 | D | 8 | 8 | 8 | 88 |
| 1 | 0 | 9 | D | 8 | 8 | 8 | 88 |
| 1 | 0 | A | D | 8 | 8 | 8 | 88 |
| 1 | 0 | B | D | 8 | 8 | 8 | 88 |
| 1 | 0 | C | D | 7 | 8 | 7 | 87 |
| 1 | 0 | D | D | 7 | 8 | 7 | 87 |
| 1 | 0 | E | D | 7 | 8 | 7 | 87 |
| 1 | 0 | F | D | 7 | 8 | 7 | 87 |
| 1 | 1 | 0 | D | 6 | 8 | 6 | 86 |
| 1 | 1 | 1 | D | 6 | 8 | 6 | 86 |
| 1 | 1 | 2 | D | 6 | 8 | 6 | 86 |
| 1 | 1 | 3 | D | 6 | 8 | 6 | 86 |
| 1 | 1 | 4 | D | 6 | 8 | 6 | 86 |
| 1 | 1 | 5 | D | 5 | 8 | 5 | 85 |
| 1 | 1 | 6 | D | 5 | 8 | 5 | 85 |
| 1 | 1 | 7 | D | 5 | 8 | 5 | 85 |
| 1 | 1 | 8 | D | 5 | 8 | 5 | 85 |
| 1 | 1 | 9 | D | 4 | 8 | 4 | 84 |
| 1 | 1 | A | D | 4 | 8 | 4 | 84 |
| 1 | 1 | B | D | 4 | 8 | 4 | 84 |
| 1 | 1 | C | D | 4 | 8 | 4 | 84 |
| 1 | 1 | D | D | 4 | 8 | 4 | 84 |
| 1 | 1 | E | D | 3 | 8 | 3 | 83 |
| 1 | 1 | F | D | 3 | 8 | 3 | 83 |
| 1 | 2 | 0 | D | 3 | 8 | 3 | 83 |
| 1 | 2 | 1 | D | 3 | 8 | 3 | 83 |
| 1 | 2 | 2 | D | 2 | 8 | 2 | 82 |
| 1 | 2 | 3 | D | 2 | 8 | 2 | 82 |
| 1 | 2 | 4 | D | 2 | 8 | 2 | 82 |
| 1 | 2 | 5 | D | 2 | 8 | 2 | 82 |
| 1 | 2 | 6 | D | 2 | 8 | 2 | 82 |
| 1 | 2 | 7 | D | 1 | 8 | 1 | 81 |
| 1 | 2 | 8 | D | 1 | 8 | 1 | 81 |
| 1 | 2 | 9 | D | 1 | 8 | 1 | 81 |
| 1 | 2 | A | D | 1 | 8 | 1 | 81 |
| 1 | 2 | B | D | 0 | 8 | 0 | 80 |
| 1 | 2 | C | D | 0 | 8 | 0 | 80 |
| 1 | 2 | D | D | 0 | 8 | 0 | 80 |
| 1 | 2 | E | D | 0 | 8 | 0 | 80 |
| 1 | 2 | F | D | 0 | 8 | 0 | 80 |
| 1 | 3 | 0 | C | F | 7 | 9 | 79 |
| 1 | 3 | 1 | C | F | 7 | 9 | 79 |
| 1 | 3 | 2 | C | F | 7 | 9 | 79 |
| 1 | 3 | 3 | C | F | 7 | 9 | 79 |
| 1 | 3 | 5 | C | E | 7 | 8 | 78 |
| 1 | 3 | 6 | C | E | 7 | 8 | 78 |
| 1 | 3 | 7 | C | E | 7 | 8 | 78 |
| 1 | 3 | 8 | C | E | 7 | 8 | 78 |
| 1 | 3 | 9 | C | D | 7 | 7 | 77 |
| 1 | 3 | A | C | D | 7 | 7 | 77 |
| 1 | 3 | B | C | D | 7 | 7 | 77 |
| 1 | 3 | C | C | D | 7 | 7 | 77 |
| 1 | 3 | D | C | D | 7 | 7 | 77 |
| 1 | 3 | E | C | C | 7 | 6 | 76 |
| 1 | 3 | F | C | C | 7 | 6 | 76 |
| 1 | 4 | 0 | C | C | 7 | 6 | 76 |
| 1 | 4 | 1 | C | C | 7 | 6 | 76 |
| 1 | 4 | 2 | 4 | B | 7 | 5 | 75 |
| 1 | 4 | 3 | 4 | B | 7 | 5 | 75 |
| 1 | 4 | 4 | 4 | B | 7 | 5 | 75 |
| 1 | 4 | 5 | 4 | B | 7 | 5 | 75 |
| 1 | 4 | 6 | 4 | B | 7 | 5 | 75 |
| 1 | 4 | 7 | 4 | A | 7 | 4 | 74 |
| 1 | 4 | 8 | 4 | A | 7 | 4 | 74 |
| 1 | 4 | 9 | 4 | A | 7 | 4 | 74 |
| 1 | 4 | A | 4 | A | 7 | 4 | 74 |
| 1 | 4 | B | 4 | A | 7 | 4 | 74 |
| 1 | 4 | C | 4 | 9 | 7 | 3 | 73 |
| 1 | 4 | D | 4 | 9 | 7 | 3 | 73 |
| 1 | 4 | E | 4 | 9 | 7 | 3 | 73 |
| 1 | 4 | F | 4 | 9 | 7 | 3 | 73 |
| 1 | 5 | 0 | 4 | 9 | 7 | 3 | 73 |
| 1 | 5 | 1 | 4 | 8 | 7 | 2 | 72 |
| 1 | 5 | 2 | 4 | 8 | 7 | 2 | 72 |
| 1 | 5 | 3 | 4 | 8 | 7 | 2 | 72 |
| 1 | 5 | 4 | 4 | 8 | 7 | 2 | 72 |
| 1 | 5 | 5 | 4 | 8 | 7 | 2 | 72 |
| 1 | 5 | 6 | 4 | 7 | 7 | 1 | 71 |
| 1 | 5 | 7 | 4 | 7 | 7 | 1 | 71 |
| 1 | 5 | 8 | 4 | 7 | 7 | 1 | 71 |
| 1 | 5 | 9 | 4 | 7 | 7 | 1 | 71 |
| 1 | 5 | A | 4 | 7 | 7 | 1 | 71 |
| 1 | 5 | B | 4 | 6 | 7 | 0 | 70 |
| 1 | 5 | C | 4 | 6 | 7 | 0 | 70 |
| 1 | 5 | D | 4 | 6 | 7 | 0 | 70 |
| 1 | 5 | E | 4 | 6 | 7 | 0 | 70 |
| 1 | 5 | F | 4 | 6 | 7 | 0 | 70 |
| 1 | 6 | 0 | 4 | 5 | 6 | 9 | 69 |
| 1 | 6 | 1 | 4 | 5 | 6 | 9 | 69 |
| 1 | 6 | 2 | 4 | 5 | 6 | 9 | 69 |
| 1 | 6 | 3 | 4 | 5 | 6 | 9 | 69 |
| 1 | 6 | 4 | 4 | 5 | 6 | 9 | 69 |
| 1 | 6 | 5 | 4 | 4 | 6 | 8 | 68 |
| 1 | 6 | 6 | 4 | 4 | 6 | 8 | 68 |
| 1 | 6 | 7 | 4 | 4 | 6 | 8 | 68 |
| 1 | 6 | 8 | 4 | 4 | 6 | 8 | 68 |
| 1 | 6 | 9 | 4 | 4 | 6 | 8 | 68 |

APPENDIX B-continued

| EPROMS 50 & 52 ADDRESS (HEX) | | | EPROM 50 CONTENTS (HEX) | | EPROM 58 CONTENTS (HEX) | | BEARING (QUADRANT) (DISPLACEMENT) (ANGLE) |
|---|---|---|---|---|---|---|---|
| A8 | A7-A4 | A3-A0 | D7-D4 | D3-D0 | D7-D4 | D3-D0 | |
| 1 | 6 | A | 4 | 3 | 6 | 7 | 67 |
| 1 | 6 | B | 4 | 3 | 6 | 7 | 67 |
| 1 | 6 | C | 4 | 3 | 6 | 7 | 67 |
| 1 | 6 | D | 4 | 3 | 6 | 7 | 67 |
| 1 | 6 | E | 4 | 3 | 6 | 7 | 67 |
| 1 | 6 | F | 4 | 2 | 6 | 6 | 66 |
| 1 | 7 | 0 | 4 | 2 | 6 | 6 | 66 |
| 1 | 7 | 1 | 4 | 2 | 6 | 6 | 66 |
| 1 | 7 | 2 | 4 | 2 | 6 | 6 | 66 |
| 1 | 7 | 3 | 4 | 2 | 6 | 6 | 66 |
| 1 | 7 | 4 | 4 | 2 | 6 | 6 | 66 |
| 1 | 7 | 5 | 4 | 1 | 6 | 5 | 65 |
| 1 | 7 | 6 | 4 | 1 | 6 | 5 | 65 |
| 1 | 7 | 7 | 4 | 1 | 6 | 5 | 65 |
| 1 | 7 | 8 | 4 | 1 | 6 | 5 | 65 |
| 1 | 7 | 9 | 4 | 1 | 6 | 5 | 65 |
| 1 | 7 | A | 4 | 0 | 6 | 4 | 64 |
| 1 | 7 | B | 4 | 0 | 6 | 4 | 64 |
| 1 | 7 | C | 4 | 0 | 6 | 4 | 64 |
| 1 | 7 | D | 4 | 0 | 6 | 4 | 64 |
| 1 | 7 | E | 4 | 0 | 6 | 4 | 64 |
| 1 | 7 | F | 4 | 0 | 6 | 4 | 64 |
| 1 | 8 | 0 | 3 | F | 6 | 3 | 63 |
| 1 | 8 | 1 | 3 | F | 6 | 3 | 63 |
| 1 | 8 | 2 | 3 | F | 6 | 3 | 63 |
| 1 | 8 | 3 | 3 | F | 6 | 3 | 63 |
| 1 | 8 | 4 | 3 | F | 6 | 3 | 63 |
| 1 | 8 | 5 | 3 | E | 6 | 2 | 62 |
| 1 | 8 | 6 | 3 | E | 6 | 2 | 62 |
| 1 | 8 | 7 | 3 | E | 6 | 2 | 62 |
| 1 | 8 | 8 | 3 | E | 6 | 2 | 62 |
| 1 | 8 | 9 | 3 | E | 6 | 2 | 62 |
| 1 | 8 | A | 3 | E | 6 | 2 | 62 |
| 1 | 8 | B | 3 | D | 6 | 1 | 61 |
| 1 | 8 | C | 3 | D | 6 | 1 | 61 |
| 1 | 8 | D | 3 | D | 6 | 1 | 61 |
| 1 | 8 | E | 3 | D | 6 | 1 | 61 |
| 1 | 8 | F | 3 | D | 6 | 1 | 61 |
| 1 | 9 | 0 | 3 | D | 6 | 1 | 61 |
| 1 | 9 | 1 | 3 | C | 6 | 0 | 60 |
| 1 | 9 | 2 | 3 | C | 6 | 0 | 60 |
| 1 | 9 | 3 | 3 | C | 6 | 0 | 60 |
| 1 | 9 | 4 | 3 | C | 6 | 0 | 60 |
| 1 | 9 | 5 | 3 | C | 6 | 0 | 60 |
| 1 | 9 | 6 | 3 | C | 6 | 0 | 60 |
| 1 | 9 | 7 | 3 | B | 5 | 9 | 59 |
| 1 | 9 | 8 | 3 | B | 5 | 9 | 59 |
| 1 | 9 | 9 | 3 | B | 5 | 9 | 59 |
| 1 | 9 | A | 3 | B | 5 | 9 | 59 |
| 1 | 9 | B | 3 | B | 5 | 9 | 59 |
| 1 | 9 | C | 3 | B | 5 | 9 | 59 |
| 1 | 9 | D | 3 | A | 5 | 8 | 58 |
| 1 | 9 | E | 3 | A | 5 | 8 | 58 |
| 1 | 9 | F | 3 | A | 5 | 8 | 58 |
| 1 | A | 0 | 3 | A | 5 | 8 | 58 |
| 1 | A | 1 | 3 | A | 5 | 8 | 58 |
| 1 | A | 2 | 3 | A | 5 | 8 | 58 |
| 1 | A | 3 | 3 | 9 | 5 | 7 | 57 |
| 1 | A | 4 | 3 | 9 | 5 | 7 | 57 |
| 1 | A | 5 | 3 | 9 | 5 | 7 | 57 |
| 1 | A | 6 | 3 | 9 | 5 | 7 | 57 |
| 1 | A | 7 | 3 | 9 | 5 | 7 | 57 |
| 1 | A | 8 | 3 | 9 | 5 | 7 | 57 |
| 1 | A | 9 | 3 | 8 | 5 | 6 | 56 |
| 1 | A | A | 3 | 8 | 5 | 6 | 56 |
| 1 | A | B | 3 | 8 | 5 | 6 | 56 |
| 1 | A | C | 3 | 8 | 5 | 6 | 56 |
| 1 | A | D | 3 | 8 | 5 | 6 | 56 |
| 1 | A | E | 3 | 8 | 5 | 6 | 56 |
| 1 | A | F | 3 | 8 | 5 | 6 | 56 |
| 1 | B | 0 | 3 | 7 | 5 | 5 | 55 |
| 1 | B | 1 | 3 | 7 | 5 | 5 | 55 |
| 1 | B | 2 | 3 | 7 | 5 | 5 | 55 |
| 1 | B | 3 | 3 | 7 | 5 | 5 | 55 |
| 1 | B | 4 | 3 | 7 | 5 | 5 | 55 |
| 1 | B | 5 | 3 | 7 | 5 | 5 | 55 |
| 1 | B | 6 | 3 | 6 | 5 | 4 | 54 |
| 1 | B | 7 | 3 | 6 | 5 | 4 | 54 |
| 1 | B | 8 | 3 | 6 | 5 | 4 | 54 |
| 1 | B | 9 | 3 | 6 | 5 | 4 | 54 |
| 1 | B | A | 3 | 6 | 5 | 4 | 54 |
| 1 | B | B | 3 | 6 | 5 | 4 | 54 |
| 1 | B | C | 3 | 6 | 5 | 4 | 54 |
| 1 | B | D | 3 | 5 | 5 | 3 | 53 |
| 1 | B | E | 3 | 5 | 5 | 3 | 53 |
| 1 | B | F | 3 | 5 | 5 | 3 | 53 |
| 1 | C | 0 | 3 | 5 | 5 | 3 | 53 |
| 1 | C | 1 | 3 | 5 | 5 | 3 | 53 |
| 1 | C | 2 | 3 | 5 | 5 | 3 | 53 |
| 1 | C | 3 | 3 | 5 | 5 | 3 | 53 |
| 1 | C | 4 | 3 | 4 | 5 | 2 | 52 |
| 1 | C | 5 | 3 | 4 | 5 | 2 | 52 |
| 1 | C | 6 | 3 | 4 | 5 | 2 | 52 |
| 1 | C | 7 | 3 | 4 | 5 | 2 | 52 |
| 1 | C | 8 | 3 | 4 | 5 | 2 | 52 |
| 1 | C | 9 | 3 | 4 | 5 | 2 | 52 |
| 1 | C | A | 3 | 4 | 5 | 2 | 52 |
| 1 | C | B | 3 | 3 | 5 | 1 | 51 |
| 1 | C | C | 3 | 3 | 5 | 1 | 51 |
| 1 | C | D | 3 | 3 | 5 | 1 | 51 |
| 1 | C | E | 3 | 3 | 5 | 1 | 51 |
| 1 | C | F | 3 | 3 | 5 | 1 | 51 |
| 1 | D | 0 | 3 | 3 | 5 | 1 | 51 |
| 1 | D | 1 | 3 | 3 | 5 | 1 | 51 |
| 1 | D | 2 | 3 | 3 | 5 | 1 | 51 |
| 1 | D | 3 | 3 | 2 | 5 | 0 | 50 |
| 1 | D | 4 | 3 | 2 | 5 | 0 | 50 |
| 1 | D | 5 | 3 | 2 | 5 | 0 | 50 |
| 1 | D | 6 | 3 | 2 | 5 | 0 | 50 |
| 1 | D | 7 | 3 | 2 | 5 | 0 | 50 |
| 1 | D | 8 | 3 | 2 | 5 | 0 | 50 |
| 1 | D | 9 | 3 | 2 | 5 | 0 | 50 |
| 1 | D | A | 3 | 1 | 4 | 9 | 49 |
| 1 | D | B | 3 | 1 | 4 | 9 | 49 |
| 1 | D | C | 3 | 1 | 4 | 9 | 49 |
| 1 | D | D | 3 | 1 | 4 | 9 | 49 |
| 1 | D | E | 3 | 1 | 4 | 9 | 49 |
| 1 | D | F | 3 | 1 | 4 | 9 | 49 |
| 1 | E | 0 | 3 | 1 | 4 | 9 | 49 |
| 1 | E | 1 | 3 | 1 | 4 | 9 | 49 |
| 1 | E | 2 | 3 | 0 | 4 | 8 | 48 |
| 1 | E | 3 | 3 | 0 | 4 | 8 | 48 |
| 1 | E | 4 | 3 | 0 | 4 | 8 | 48 |
| 1 | E | 5 | 3 | 0 | 4 | 8 | 48 |
| 1 | E | 6 | 3 | 0 | 4 | 8 | 48 |
| 1 | E | 7 | 3 | 0 | 4 | 8 | 48 |
| 1 | E | 8 | 3 | 0 | 4 | 8 | 48 |
| 1 | E | 9 | 3 | 0 | 4 | 8 | 48 |
| 1 | E | A | 2 | F | 4 | 7 | 47 |
| 1 | E | B | 2 | F | 4 | 7 | 47 |
| 1 | E | C | 2 | F | 4 | 7 | 47 |
| 1 | E | D | 2 | F | 4 | 7 | 47 |
| 1 | E | E | 2 | F | 4 | 7 | 47 |
| 1 | E | F | 2 | F | 4 | 7 | 47 |
| 1 | F | 0 | 2 | F | 4 | 7 | 47 |
| 1 | F | 1 | 2 | F | 4 | 7 | 47 |
| 1 | F | 2 | 2 | E | 4 | 6 | 46 |
| 1 | F | 3 | 2 | E | 4 | 6 | 46 |
| 1 | F | 4 | 2 | E | 4 | 6 | 46 |
| 1 | F | 5 | 2 | E | 4 | 6 | 46 |
| 1 | F | 6 | 2 | E | 4 | 6 | 46 |
| 1 | F | 7 | 2 | E | 4 | 6 | 46 |
| 1 | F | 8 | 2 | E | 4 | 6 | 46 |
| 1 | F | 9 | 2 | E | 4 | 6 | 46 |
| 1 | F | A | 2 | E | 4 | 6 | 46 |
| 1 | F | B | 2 | D | 4 | 5 | 45 |
| 1 | F | C | 2 | D | 4 | 5 | 45 |
| 1 | F | D | 2 | D | 4 | 5 | 45 |
| 1 | F | E | 2 | D | 4 | 5 | 45 |

APPENDIX B-continued

| EPROMS 50 & 52 ADDRESS (HEX) | | EPROM 50 CONTENTS (HEX) | | EPROM 58 CONTENTS (HEX) | | BEARING (QUADRANT) (DISPLACEMENT) (ANGLE) |
|---|---|---|---|---|---|---|
| A8 | A7-A4 A3-A0 | D7-D4 | D3-D0 | D7-D4 | D3-D0 | |
| 1 | F  F | 2 | D | 4 | 5 | 45 |

APPENDIX C

| EPROM 52 ADDRESS (HEX) | | | EPROM 52 CONTENTS (HEX) | | BEARING INDICATION |
|---|---|---|---|---|---|
| A8 | A7-A4 | A3-A0 | D7-D4 | D3-D0 | |
| 0 | 0 | 0 | 0 | 0 | 0 |
| 0 | 0 | 1 | 0 | 1 | 1 |
| 0 | 0 | 2 | 0 | 2 | 2 |
| 0 | 0 | 3 | 0 | 3 | 3 |
| 0 | 0 | 4 | 0 | 4 | 4 |
| 0 | 0 | 5 | 0 | 5 | 5 |
| 0 | 0 | 6 | 0 | 6 | 6 |
| 0 | 0 | 7 | 0 | 7 | 7 |
| 0 | 0 | 8 | 0 | 8 | 8 |
| 0 | 0 | 9 | 0 | 9 | 9 |
| 0 | 0 | A | 0 | A | 10 |
| 0 | 0 | B | 0 | B | 11 |
| 0 | 0 | C | 0 | C | 12 |
| 0 | 0 | D | 0 | D | 13 |
| 0 | 0 | E | 0 | E | 14 |
| 0 | 0 | F | 0 | F | 15 |
| 0 | 1 | 0 | 1 | 0 | 16 |
| 0 | 1 | 1 | 1 | 1 | 17 |
| 0 | 1 | 2 | 1 | 2 | 18 |
| 0 | 1 | 3 | 1 | 3 | 19 |
| 0 | 1 | 4 | 1 | 4 | 20 |
| 0 | 1 | 5 | 1 | 5 | 21 |
| 0 | 1 | 6 | 1 | 6 | 22 |
| 0 | 1 | 7 | 1 | 7 | 23 |
| 0 | 1 | 8 | 1 | 8 | 24 |
| 0 | 1 | 9 | 1 | 9 | 25 |
| 0 | 1 | A | 1 | A | 26 |
| 0 | 1 | B | 1 | B | 27 |
| 0 | 1 | C | 1 | C | 28 |
| 0 | 1 | D | 1 | D | 29 |
| 0 | 1 | E | 1 | E | 30 |
| 0 | 1 | F | 1 | F | 31 |
| 0 | 2 | 0 | 2 | 0 | 32 |
| 0 | 2 | 1 | 2 | 1 | 33 |
| 0 | 2 | 2 | 2 | 2 | 34 |
| 0 | 2 | 3 | 2 | 3 | 35 |
| 0 | 2 | 4 | 2 | 4 | 36 |
| 0 | 2 | 5 | 2 | 5 | 37 |
| 0 | 2 | 6 | 2 | 6 | 38 |
| 0 | 2 | 7 | 2 | 7 | 39 |
| 0 | 2 | 8 | 2 | 8 | 40 |
| 0 | 2 | 9 | 2 | 9 | 41 |
| 0 | 2 | A | 2 | A | 42 |
| 0 | 2 | B | 2 | B | 43 |
| 0 | 2 | C | 2 | C | 44 |
| 0 | 2 | D | 2 | D | 45 |
| 0 | 2 | E | 2 | E | 46 |
| 0 | 2 | F | 2 | F | 47 |
| 0 | 3 | 0 | 3 | 0 | 48 |
| 0 | 3 | 1 | 3 | 1 | 49 |
| 0 | 3 | 2 | 3 | 2 | 50 |
| 0 | 3 | 3 | 3 | 3 | 51 |
| 0 | 3 | 4 | 3 | 4 | 52 |
| 0 | 3 | 5 | 3 | 5 | 53 |
| 0 | 3 | 6 | 3 | 6 | 54 |
| 0 | 3 | 7 | 3 | 7 | 55 |
| 0 | 3 | 8 | 3 | 8 | 56 |
| 0 | 3 | 9 | 3 | 9 | 57 |
| 0 | 3 | A | 3 | A | 58 |
| 0 | 3 | B | 3 | B | 59 |
| 0 | 3 | C | 3 | C | 60 |
| 0 | 3 | D | 3 | D | 61 |
| 0 | 3 | E | 3 | E | 62 |
| 0 | 3 | F | 3 | F | 63 |
| 0 | 4 | 0 | 4 | 0 | 64 |
| 0 | 4 | 1 | 4 | 1 | 65 |

APPENDIX C-continued

| EPROM 52 ADDRESS (HEX) | | EPROM 52 CONTENTS (HEX) | | BEARING INDICATION |
|---|---|---|---|---|
| A8 | A7-A4 A3-A0 | D7-D4 | D3-D0 | |
| 0 | 4 | 2 | 4 | 2 | 66 |
| 0 | 4 | 3 | 4 | 3 | 67 |
| 0 | 4 | 4 | 4 | 4 | 68 |
| 0 | 4 | 5 | 4 | 5 | 69 |
| 0 | 4 | 6 | 4 | 6 | 70 |
| 0 | 4 | 7 | 4 | 7 | 71 |
| 0 | 4 | 8 | 4 | 8 | 72 |
| 0 | 4 | 9 | 4 | 9 | 73 |
| 0 | 4 | A | 4 | A | 74 |
| 0 | 4 | B | 4 | B | 75 |
| 0 | 4 | C | 4 | C | 76 |
| 0 | 4 | D | 4 | D | 77 |
| 0 | 4 | E | 4 | E | 78 |
| 0 | 4 | F | 4 | F | 79 |
| 0 | 5 | 0 | 5 | 0 | 80 |
| 0 | 5 | 1 | 5 | 1 | 81 |
| 0 | 5 | 2 | 5 | 2 | 82 |
| 0 | 5 | 3 | 5 | 3 | 83 |
| 0 | 5 | 4 | 5 | 4 | 84 |
| 0 | 5 | 5 | 5 | 5 | 85 |
| 0 | 5 | 6 | 5 | 6 | 86 |
| 0 | 5 | 7 | 5 | 7 | 87 |
| 0 | 5 | 8 | 5 | 8 | 88 |
| 0 | 5 | 9 | 5 | 9 | 89 |
| 0 | 5 | A | 5 | A | 90 |
| 0 | 8 | 0 | 5 | A | 90 |
| 0 | 8 | 1 | 5 | B | 91 |
| 0 | 8 | 2 | 5 | C | 92 |
| 0 | 8 | 3 | 5 | D | 93 |
| 0 | 8 | 4 | 5 | E | 94 |
| 0 | 8 | 5 | 5 | F | 95 |
| 0 | 8 | 6 | 6 | 0 | 96 |
| 0 | 8 | 7 | 6 | 1 | 97 |
| 0 | 8 | 8 | 6 | 2 | 98 |
| 0 | 8 | 9 | 6 | 3 | 99 |
| 0 | 8 | A | 6 | 4 | 100 |
| 0 | 8 | B | 6 | 5 | 101 |
| 0 | 8 | C | 6 | 6 | 102 |
| 0 | 8 | D | 6 | 7 | 103 |
| 0 | 8 | E | 6 | 8 | 104 |
| 0 | 8 | F | 6 | 9 | 105 |
| 0 | 9 | 0 | 6 | A | 106 |
| 0 | 9 | 1 | 6 | B | 107 |
| 0 | 9 | 2 | 6 | C | 108 |
| 0 | 9 | 3 | 6 | D | 109 |
| 0 | 9 | 4 | 6 | E | 110 |
| 0 | 9 | 5 | 6 | F | 111 |
| 0 | 9 | 6 | 7 | 0 | 112 |
| 0 | 9 | 7 | 7 | 1 | 113 |
| 0 | 9 | 8 | 7 | 2 | 114 |
| 0 | 9 | 9 | 7 | 3 | 115 |
| 0 | 9 | A | 7 | 4 | 116 |
| 0 | 9 | B | 7 | 5 | 117 |
| 0 | 9 | C | 7 | 6 | 118 |
| 0 | 9 | D | 7 | 7 | 119 |
| 0 | 9 | E | 7 | 8 | 120 |
| 0 | 9 | F | 7 | 9 | 121 |
| 0 | A | 0 | 7 | A | 122 |
| 0 | A | 1 | 7 | B | 123 |
| 0 | A | 2 | 7 | C | 124 |
| 0 | A | 3 | 7 | D | 125 |
| 0 | A | 4 | 7 | E | 126 |
| 0 | A | 5 | 7 | F | 127 |
| 0 | A | 6 | 8 | 0 | 128 |
| 0 | A | 7 | 8 | 1 | 129 |
| 0 | A | 8 | 8 | 2 | 130 |
| 0 | A | 9 | 8 | 3 | 131 |
| 0 | A | A | 8 | 4 | 132 |
| 0 | A | B | 8 | 5 | 133 |
| 0 | A | C | 8 | 6 | 134 |
| 0 | A | D | 8 | 7 | 135 |
| 0 | A | E | 8 | 8 | 136 |
| 0 | A | F | 8 | 9 | 137 |
| 0 | B | 0 | 8 | A | 138 |
| 0 | B | 1 | 8 | B | 139 |
| 0 | B | 2 | 8 | C | 140 |
| 0 | B | 3 | 8 | D | 141 |
| 0 | B | 4 | 8 | E | 142 |

APPENDIX C-continued

| EPROM 52 ADDRESS (HEX) | | | EPROM 52 CONTENTS (HEX) | | BEARING INDICATION |
|---|---|---|---|---|---|
| A8 | A7-A4 | A3-A0 | D7-D4 | D3-D0 | |
| 0 | B | 5 | 8 | F | 143 |
| 0 | B | 6 | 9 | 0 | 144 |
| 0 | B | 7 | 9 | 1 | 145 |
| 0 | B | 8 | 9 | 2 | 146 |
| 0 | B | 9 | 9 | 3 | 147 |
| 0 | B | A | 9 | 4 | 148 |
| 0 | B | B | 9 | 5 | 149 |
| 0 | B | C | 9 | 6 | 150 |
| 0 | B | D | 9 | 7 | 151 |
| 0 | B | E | 9 | 8 | 152 |
| 0 | B | F | 9 | 9 | 153 |
| 0 | C | 0 | 9 | A | 154 |
| 0 | C | 1 | 9 | B | 155 |
| 0 | C | 2 | 9 | C | 156 |
| 0 | C | 3 | 9 | D | 157 |
| 0 | C | 4 | 9 | E | 158 |
| 0 | C | 5 | 9 | F | 159 |
| 0 | C | 6 | A | 0 | 160 |
| 0 | C | 7 | A | 1 | 161 |
| 0 | C | 8 | A | 2 | 162 |
| 0 | C | 9 | A | 3 | 163 |
| 0 | C | A | A | 4 | 164 |
| 0 | C | B | A | 5 | 165 |
| 0 | C | C | A | 6 | 166 |
| 0 | C | D | A | 7 | 167 |
| 0 | C | E | A | 8 | 168 |
| 0 | C | F | A | 9 | 169 |
| 0 | D | 0 | A | A | 170 |
| 0 | D | 1 | A | B | 171 |
| 0 | D | 2 | A | C | 172 |
| 0 | D | 3 | A | D | 173 |
| 0 | D | 4 | A | E | 174 |
| 0 | D | 5 | A | F | 175 |
| 0 | D | 6 | B | 0 | 176 |
| 0 | D | 7 | B | 1 | 177 |
| 0 | D | 8 | B | 2 | 178 |
| 0 | D | 9 | B | 3 | 179 |
| 0 | D | A | B | 4 | 180 |
| 1 | 0 | 0 | B | 4 | 180 |
| 1 | 0 | 1 | B | 5 | 181 |
| 1 | 0 | 2 | B | 6 | 182 |
| 1 | 0 | 3 | B | 7 | 183 |
| 1 | 0 | 4 | B | 8 | 184 |
| 1 | 0 | 5 | B | 9 | 185 |
| 1 | 0 | 6 | B | A | 186 |
| 1 | 0 | 7 | B | B | 187 |
| 1 | 0 | 8 | B | C | 188 |
| 1 | 0 | 9 | B | D | 189 |
| 1 | 0 | A | B | E | 190 |
| 1 | 0 | B | B | F | 191 |
| 1 | 0 | C | C | 0 | 192 |
| 1 | 0 | D | C | 1 | 193 |
| 1 | 0 | E | C | 2 | 194 |
| 1 | 0 | F | C | 3 | 195 |
| 1 | 1 | 0 | C | 4 | 196 |
| 1 | 1 | 1 | C | 5 | 197 |
| 1 | 1 | 2 | C | 6 | 198 |
| 1 | 1 | 3 | C | 7 | 199 |
| 1 | 1 | 4 | C | 8 | 200 |
| 1 | 1 | 5 | C | 9 | 201 |
| 1 | 1 | 6 | C | A | 202 |
| 1 | 1 | 7 | C | B | 203 |
| 1 | 1 | 8 | C | C | 204 |
| 1 | 1 | 9 | C | D | 205 |
| 1 | 1 | A | C | E | 206 |
| 1 | 1 | B | C | F | 207 |
| 1 | 1 | C | D | 0 | 208 |
| 1 | 1 | D | D | 1 | 209 |
| 1 | 1 | E | D | 2 | 210 |
| 1 | 1 | F | D | 3 | 211 |
| 1 | 2 | 0 | D | 4 | 212 |
| 1 | 2 | 1 | D | 5 | 213 |
| 1 | 2 | 2 | D | 6 | 214 |
| 1 | 2 | 3 | D | 7 | 215 |
| 1 | 2 | 4 | D | 8 | 216 |
| 1 | 2 | 5 | D | 9 | 217 |
| 1 | 2 | 6 | D | A | 218 |
| 1 | 2 | 7 | D | B | 219 |
| 1 | 2 | 8 | D | C | 220 |
| 1 | 2 | 9 | D | D | 221 |
| 1 | 2 | A | D | E | 222 |
| 1 | 2 | B | D | F | 223 |
| 1 | 2 | C | E | 0 | 224 |
| 1 | 2 | D | E | 1 | 225 |
| 1 | 2 | E | E | 2 | 226 |
| 1 | 2 | F | E | 3 | 227 |
| 1 | 3 | 0 | E | 4 | 228 |
| 1 | 3 | 1 | E | 5 | 229 |
| 1 | 3 | 2 | E | 6 | 230 |
| 1 | 3 | 3 | E | 7 | 231 |
| 1 | 3 | 4 | E | 8 | 232 |
| 1 | 3 | 5 | E | 9 | 233 |
| 1 | 3 | 6 | E | A | 234 |
| 1 | 3 | 7 | E | B | 235 |
| 1 | 3 | 8 | E | C | 236 |
| 1 | 3 | 9 | E | D | 237 |
| 1 | 3 | A | E | E | 238 |
| 1 | 3 | B | E | F | 239 |
| 1 | 3 | C | F | 0 | 240 |
| 1 | 3 | D | F | 1 | 241 |
| 1 | 3 | E | F | 2 | 242 |
| 1 | 3 | F | F | 3 | 243 |
| 1 | 4 | 0 | F | 4 | 244 |
| 1 | 4 | 1 | F | 5 | 245 |
| 1 | 4 | 2 | F | 6 | 246 |
| 1 | 4 | 3 | F | 7 | 247 |
| 1 | 4 | 4 | F | 8 | 248 |
| 1 | 4 | 5 | F | 9 | 249 |
| 1 | 4 | 6 | F | A | 250 |
| 1 | 4 | 7 | F | B | 251 |
| 1 | 4 | 8 | F | C | 252 |
| 1 | 4 | 9 | F | D | 253 |
| 1 | 4 | A | F | E | 254 |
| 1 | 4 | B | F | F | 255 |
| 1 | 4 | C | 0 | 0 | 256 |
| 1 | 4 | D | 0 | 1 | 257 |
| 1 | 4 | E | 0 | 2 | 258 |
| 1 | 4 | F | 0 | 3 | 259 |
| 1 | 5 | 0 | 0 | 4 | 260 |
| 1 | 5 | 1 | 0 | 5 | 261 |
| 1 | 5 | 2 | 0 | 6 | 262 |
| 1 | 5 | 3 | 0 | 7 | 263 |
| 1 | 5 | 4 | 0 | 8 | 264 |
| 1 | 5 | 5 | 0 | 9 | 265 |
| 1 | 5 | 6 | 0 | A | 266 |
| 1 | 5 | 7 | 0 | B | 267 |
| 1 | 5 | 8 | 0 | C | 268 |
| 1 | 5 | 9 | 0 | D | 269 |
| 1 | 5 | A | 0 | E | 270 |
| 1 | 8 | 0 | 0 | E | 270 |
| 1 | 8 | 1 | 0 | F | 271 |
| 1 | 8 | 2 | 1 | 0 | 272 |
| 1 | 8 | 3 | 1 | 1 | 273 |
| 1 | 8 | 4 | 1 | 2 | 274 |
| 1 | 8 | 5 | 1 | 3 | 275 |
| 1 | 8 | 6 | 1 | 4 | 276 |
| 1 | 8 | 7 | 1 | 5 | 277 |
| 1 | 8 | 8 | 1 | 6 | 278 |
| 1 | 8 | 9 | 1 | 7 | 279 |
| 1 | 8 | A | 1 | 8 | 280 |
| 1 | 8 | B | 1 | 9 | 281 |
| 1 | 8 | C | 1 | A | 282 |
| 1 | 8 | D | 1 | B | 283 |
| 1 | 8 | E | 1 | C | 284 |
| 1 | 8 | F | 1 | D | 285 |
| 1 | 9 | 0 | 1 | E | 286 |
| 1 | 9 | 1 | 1 | F | 287 |
| 1 | 9 | 2 | 2 | 0 | 288 |
| 1 | 9 | 3 | 2 | 1 | 289 |
| 1 | 9 | 4 | 2 | 2 | 290 |
| 1 | 9 | 5 | 2 | 3 | 291 |
| 1 | 9 | 6 | 2 | 4 | 292 |
| 1 | 9 | 7 | 2 | 5 | 293 |
| 1 | 9 | 8 | 2 | 6 | 294 |
| 1 | 9 | 9 | 2 | 7 | 295 |
| 1 | 9 | A | 2 | 8 | 296 |

APPENDIX C-continued

| EPROM 52 ADDRESS (HEX) | | EPROM 52 CONTENTS (HEX) | | BEARING INDICATION |
|---|---|---|---|---|
| A8 | A7-A4 A3-A0 | D7-D4 | D3-D0 | |
| 1 | 9 B | 2 | 9 | 297 |
| 1 | 9 C | 2 | A | 298 |
| 1 | 9 D | 2 | B | 299 |
| 1 | 9 E | 2 | C | 300 |
| 1 | 9 F | 2 | D | 301 |
| 1 | A 0 | 2 | E | 302 |
| 1 | A 1 | 2 | F | 303 |
| 1 | A 2 | 3 | 0 | 304 |
| 1 | A 3 | 3 | 1 | 305 |
| 1 | A 4 | 3 | 2 | 306 |
| 1 | A 5 | 3 | 3 | 307 |
| 1 | A 6 | 3 | 4 | 308 |
| 1 | A 7 | 3 | 5 | 309 |
| 1 | A 8 | 3 | 6 | 310 |
| 1 | A 9 | 3 | 7 | 311 |
| 1 | A A | 3 | 8 | 312 |
| 1 | A B | 3 | 9 | 313 |
| 1 | A C | 3 | A | 314 |
| 1 | A D | 3 | B | 315 |
| 1 | A E | 3 | C | 316 |
| 1 | A F | 3 | D | 317 |
| 1 | B 0 | 3 | E | 318 |
| 1 | B 1 | 3 | F | 319 |
| 1 | B 2 | 4 | 0 | 320 |
| 1 | B 3 | 4 | 1 | 321 |
| 1 | B 4 | 4 | 2 | 322 |
| 1 | B 5 | 4 | 3 | 323 |
| 1 | B 6 | 4 | 4 | 324 |
| 1 | B 7 | 4 | 5 | 325 |
| 1 | B 8 | 4 | 6 | 326 |
| 1 | B 9 | 4 | 7 | 327 |
| 1 | B A | 4 | 8 | 328 |
| 1 | B B | 4 | 9 | 329 |
| 1 | B C | 4 | A | 330 |
| 1 | B D | 4 | B | 331 |
| 1 | B E | 4 | C | 332 |
| 1 | B F | 4 | D | 333 |
| 1 | C 0 | 4 | E | 334 |
| 1 | C 1 | 4 | F | 335 |
| 1 | C 2 | 5 | 0 | 336 |
| 1 | C 3 | 5 | 1 | 337 |
| 1 | C 4 | 5 | 2 | 338 |
| 1 | C 5 | 5 | 3 | 339 |
| 1 | C 6 | 5 | 4 | 340 |
| 1 | C 7 | 5 | 5 | 341 |
| 1 | C 8 | 5 | 6 | 342 |
| 1 | C 9 | 5 | 7 | 343 |
| 1 | C A | 5 | 8 | 344 |
| 1 | C B | 5 | 9 | 345 |
| 1 | C C | 5 | A | 346 |
| 1 | C D | 5 | B | 347 |
| 1 | C E | 5 | C | 348 |
| 1 | C F | 5 | D | 349 |
| 1 | D 0 | 5 | E | 350 |
| 1 | D 1 | 5 | F | 351 |
| 1 | D 2 | 6 | 0 | 352 |
| 1 | D 3 | 6 | 1 | 353 |
| 1 | D 4 | 6 | 2 | 354 |
| 1 | D 5 | 6 | 3 | 355 |
| 1 | D 6 | 6 | 4 | 356 |
| 1 | D 7 | 6 | 5 | 357 |
| 1 | D 8 | 6 | 6 | 358 |
| 1 | D 9 | 6 | 7 | 359 |
| 1 | D A | 6 | 8 | 360 |

APPENDIX D

| EPROM 60 ADDRESS (HEX) | | EPROM 60 CONTENTS (HEX) | | BEARING QUADRANT |
|---|---|---|---|---|
| A8 | A7-A4 A3-A0 | D7-D4 | D3-D0 | |
| 0 | 0 0 | 0 | 0 | 1 |
| 0 | 0 1 | 0 | 1 | 1 |
| 0 | 0 2 | 0 | 2 | 1 |
| 0 | 0 3 | 0 | 3 | 1 |
| 0 | 0 4 | 0 | 4 | 1 |
| 0 | 0 5 | 0 | 5 | 1 |
| 0 | 0 6 | 0 | 6 | 1 |
| 0 | 0 7 | 0 | 7 | 1 |
| 0 | 0 8 | 0 | 8 | 1 |
| 0 | 0 9 | 0 | 9 | 1 |
| 0 | 1 0 | 0 | 9 | 2 |
| 0 | 1 1 | 1 | 0 | 2 |
| 0 | 1 2 | 1 | 1 | 2 |
| 0 | 1 3 | 1 | 2 | 2 |
| 0 | 1 4 | 1 | 3 | 2 |
| 0 | 1 5 | 1 | 4 | 2 |
| 0 | 1 6 | 1 | 5 | 2 |
| 0 | 1 7 | 1 | 6 | 2 |
| 0 | 1 8 | 1 | 7 | 2 |
| 0 | 1 9 | 1 | 8 | 2 |
| 0 | 2 0 | 1 | 8 | 3 |
| 0 | 2 1 | 1 | 9 | 3 |
| 0 | 2 2 | 2 | 0 | 3 |
| 0 | 2 3 | 2 | 1 | 3 |
| 0 | 2 4 | 2 | 2 | 3 |
| 0 | 2 5 | 2 | 3 | 3 |
| 0 | 2 6 | 2 | 4 | 3 |
| 0 | 2 7 | 2 | 5 | 3 |
| 0 | 2 8 | 2 | 6 | 3 |
| 0 | 2 9 | 2 | 7 | 3 |
| 0 | 3 0 | 2 | 7 | 4 |
| 0 | 3 1 | 2 | 8 | 4 |
| 0 | 3 2 | 2 | 9 | 4 |
| 0 | 3 3 | 3 | 0 | 4 |
| 0 | 3 4 | 3 | 1 | 4 |
| 0 | 3 5 | 3 | 2 | 4 |
| 0 | 3 6 | 3 | 3 | 4 |
| 0 | 3 7 | 3 | 4 | 4 |
| 0 | 3 8 | 3 | 5 | 4 |
| 0 | 3 9 | 3 | 6 | 4 |

What is claimed as new and desired to be secured by Letters Patent of the United States is:

1. An improved digital compass of the type in which a two-axis earth's magnetic field sensor generates two bipolar analog signals, an x-axis signal and a y-axis signal indicative of bearing, which define sine and cosine functions when said two-axis earth's magnetic field sensor is rotated in the earth's magnetic field, and in which a bearing processor is operatively connected to said two-axis earth's magnetic field sensor for computing a digital bearing in binary form, wherein the improvement comprises:

means operatively connected to said two-axis earth's magnetic field sensor for generating the absolute values of the x-axis signal and the y-axis signal;

means operatively connected to said two-axis earth's magnetic field sensor for detecting the polarities of the x-axis signal and the y-axis signal as indicated by $S_x^*$ and $S_y^*$ signals, respectively, and wherein the $S_x^*$ and $S_y^*$ signals are logical "0" for a respective positive axis and a logical "1" for a respective negative axis information;

means connected to said means for determining the absolute values of the x-axis signal and the y-axis signal for comparing the magnitudes thereof to determine which axis has the larger absolute magnitude, wherein a logical "0" output from said means for comparing the magnitudes is indicative of the fact that $|y| < |x|$, and a logical "1" indicative of the fact that $|y| > |x|$;

a double-pole-double-throw (DPDT) electronic switch having first and second poles operatively connected to the output of said magnitude comparing means, a first set of terminals being operatively connected to the x-axis absolute value output and a second set of terminals being operatively connected to the y-axis absolute value output of said absolute value generating means, the output of said magnitude comparing means controlling the position of said DPDT electronic switch such that the smaller of the absolute value of x or y is always fed to said first pole and the larger of the absolute values of $|x|$ or $|y|$ is always fed to said second pole;

an analog-to-digital converter connected at an $I_{IN}$ input to said first pole of said DPDT electronic switch and operatively connected at an $I_{REF}$ input to said second pole of said DPDT electronic switch, said analog-to-digital converter being configured for ratiometric measurements, wherein the digital output is the ratio $I_{IN}/I_{REF}$ of the analog inputs, and wherein said analog-to-digital converter computes the ratio y/x for the angles 335° thru 45° and 135° thru 225° and the ratio x/y for the remaining angles 45° thru 135° and 225° thru 335°;

means connected to said means for detecting the polarities of the x-axis signal and the y-axis signal ($S_x^*$ and $S_y^*$ respectively) and operatively connected to a data valid (DV) output of said analog-to-digital converter at its STR input for latching the polarity of the axis information at the end of each analog-to-digital conversion upon the application of a DV signal to eliminate the effects of changing polarities of the axes of said two-axis earth's magnetic field sensor during rotation thereof while a bearing indication is being presented, wherein $S_x$ is representative of $S_x^*$ after storage and $S_y$ is representative of $S_y^*$ after storage;

a first exclusive-OR circuit connected to said means for storing means polarity data for generating the logic signal $S_x \oplus S_y$ at its output;

a second exclusive-OR circuit connected to the output of said first exclusive-OR circuit and connected to the output of said means for comparing the magnitudes of the x-axis signal and the y-axis signal for generating the logic control signal $S_x \oplus S_y \oplus (|y| > |x|)$; and a memory unit operatively connected to the output of said analog-to-digital converter and to the output of said second exclusive-OR circuit and being programmed in such a fashion as to compute the arc tangent of the ratio y/x or the ratio x/y according to the output of said analog-to-digital converter and the logic control signal $S_x \oplus S_y \oplus (|y| > |x|)$, and said memory unit also being programmed in such a fashion as to output a quadrant displacement angle in binary form from 0° thru 90° referenced to the cardinal point forming the lower boundary of the quadrant of interest, the quadrant displacement angle in binary form, along with the logic signals $S_y$ and $S_x \oplus S_y$ being representative of the digital bearing.

2. An improved digital compass according to claim 1 further comprising:

a digital-to-analog converter connected to the output of said first exclusive-OR circuit, to the $S_y$ output of said means for latching, and to the data output of said memory unit for converting the binary bearing representation into an analog bearing representation at its output; and a display device connected to the output of said digital-to-analog converter for converting the analog bearing representation at its input into an angular indication of bearing.

3. An improved digital compass according to claim 2 wherein said display device includes a linear scale for converting the analog bearing representation of 0 to −3.6 vdc into a corresponding bearing of 0° to 360°.

4. An improved digital compass according to claim 1 or claim 2 further comprising means operatively connected to said two-axis earth's magnetic field sensor for conditioning the x-axis signal and the y-axis signal therefrom.

5. An improved digital compass according to claim 4 further comprising means connected between said second pole of said DPDT electronic switch and the $I_{REF}$ input of said analog-to-digital converter for inverting the analog signal thereat.

6. An improved digital compass according to claim 5 further comprising means, connected between the data valid (DV) output of said analog-to-digital converter, the store (STR) input of said means for latching and the complement store ($\overline{STR}$) input of said memory unit, for inverting the digital signal thereat.

7. An improved digital compass of the type in which a two-axis earth's magnetic field sensor generates two bipolar analog signals, an x-axis signal and a y-axis signal indicative of bearing, which define sine and cosine functions when said two-axis earth's magnetic field sensor is rotated in the earth's magnetic field, and in which a bearing processor is operatively connected to said two-axis earth's magnetic field sensor for computing a digital bearing in binary integer form, wherein the improvement comprises:

means operatively connected to said two-axis earth's magnetic field sensor for generating the absolute values of the x-axis signal and the y-axis signal;

means operatively connected to said two-axis earth's magnetic field sensor for detecting the polarities of the x-axis signal and the y-axis signal as indicated by $S_x^*$ and $S_y^*$ signals, respectively, and wherein the $S_x^*$ and $S_y^*$ signals are logical "0" for a respective positive axis and a logical "1" for a respective negative axis information;

means connected to said means for determining the absolute values of the x-axis signal and the y-axis signal for comparing the magnitudes thereof to determine which axis has the larger absolute magnitude, wherein a logical "0" output from said means for comparing the magnitudes is indicative of the fact that $|y| < |x|$, and a logical "1" is indicative of the fact that $|y| > |x|$;

a double-pole-double-throw (DPDT) electronic switch having first and second poles operatively connected to the output of said magnitude comparing means, a first set of terminals being operatively connected to the x-axis absolute value output and a second set of terminals being operatively connected to the y-axis absolute value output of said absolute value generating means, the output of said magnitude comparing means controlling the position of said DPDT electronic switch such that the smaller of the absolute value of x or y is always fed to said first pole and the larger of the absolute values of x or y is always fed to said second pole;

an analog-to-digital converter connected at an $I_{IN}$ input to said first pole of said DPDT electronic switch and operatively connected at an $I_{REF}$ input to said second pole of said DPDT electronic switch, said analog-to-digital converter being configured for ratiometric measurements, wherein the digital output is the ratio $I_{IN}/I_{REF}$ of the analog inputs, and wherein said analog-to-digital converter computes the ratio y/x for the angles 335° thru 45° and 135° thru 225° and the ratio x/y for the remaining angles 45° thru 135° and 225° thru 335°;

means connected to said means for detecting the polarities of the x-axis signal and the y-axis signal ($S_x^*$ and $S_y^*$ respectively) and operatively connected to a data valid (DV) output of said analog-to-digital converter at its STR input for latching the polarity of the axis information at the end of each analog-to-digital conversion upon the application of a DV signal to eliminate the effects of changing polarities of the axes of said two-axis earth's magnetic field sensor during rotation thereof while a bearing indication is being presented, wherein $S_x$ is representative of $S_x^*$ after storage and $\overline{S}_x$ is the complement thereof, and $S_y$ is representative of $S_y^*$ after storage;

a first exclusive-OR circuit connected to said means for storing axes polarity data for generating the logic signal $S_x \oplus S_y$ at its output;

a second exclusive-OR circuit connected to the output of said first exclusive-OR circuit and connected to the output of said means for comparing the magnitudes of the x-axis signal and the y-axis signal for generating the logic control signal $S_x \oplus S_y \oplus (|y| > |x|)$;

a first memory unit operatively connected to the output of said analog-to-digital converter and connected to the output of said second exclusive-OR circuit and being programmed in such a fashion as to compute the arc tangent of the ratio y/x or the ratio x/y according to the output of said analog/to-digital converter and the logic control signal $S_x \oplus S_y \oplus (|y| > |x|)$, and said first memory unit being programmed in such a fashion as to output a quadrant displacement angle in binary integer form from 0° thru 90° referenced to the cardinal point forming the lower boundary of the quadrant of interest, and to output a logic signal at output D7 thereof which is logic "1" for quadrant displacement angles $\geq 76°$;

a most significant bit (MSB) generator connected to the D7 output of said first memory unit and to the $\overline{S}_x$ and $S_y$ logic signal outputs of said means for latching for determining the MSB according to the logical operation, $(D7 + \overline{S}_x)S_y$, wherein the MSB goes to logic "1" for a bearing $\geq 256°$; and a second memory unit operatively connected to the output of said analog-to-digital converter, operatively connected to the output of said first memory unit, connected to the output of said first exclusive-OR circuit, and connected to the $S_y$ output of said means for latching, and being programmed in such a fashion as to compute the lower bits of the digital bearing in binary integer form, the MSB being the other bit thereof.

8. An improved digital compass according to claim 7 further comprising means operatively connected to said two-axis earth's magnetic field sensor for conditioning the x-axis signal and the y-axis signal therefrom.

9. An improved digital compass according to claim 8 further comprising means operatively connected between said second pole of said DPDT electronic switch and the $I_{REF}$ input of said analog-to-digital converter for inverting the analog signal thereat.

10. An improved digital compass according to claim 9 further comprising means operatively connected between the data valid (DV) output of said analog-to-digital converter, the store (STR) input of said means for latching and the complement store ($\overline{STR}$) input of said first memory unit for inverting the digital signal thereat.

11. An improved digital compass according to claim 10 further comprising means, operatively connected between the DV output of said analog-to-digital converter and the complement store ($\overline{STR}$) input of said second memory unit, for delaying the DV signal thereat.

12. An improved digital compass of the type in which a two-axis earth's magnetic field sensor generates two bipolar analog signals, an x-axis signal and a y-axis signal indicative of bearing, which define sine and cosine functions when said two-axis earth's magnetic field sensor is rotated in the earth's magnetic field, and in which a bearing processor is operatively connected to said two-axis earth's magnetic field sensor for computing a digital bearing in binary-coded-decimal (BCD) form, wherein the improvement comprises:

means operatively connected to said two-axis earth's magnetic field sensor for generating the absolute values of the x-axis signal and the y-axis signal;

means operatively connected to said two-axis earth's magnetic field sensor for detecting the polarities of the x-axis signal and the y-axis signal as indicated by $S_x^*$ and $S_y^*$ signals, respectively, and wherein the $S_x^*$ and $S_y^*$ signals are logical "0" for a respective positive axis and a logical "1" for a respective negative axis information;

means connected to said means for determining the absolute values of the x-axis signal and the y-axis signal for comparing the magnitudes thereof to determine which axis has the larger absolute magnitude, wherein a logical "0" output from said means for comparing the magnitudes is indicative of the fact that $|y| < |x|$, and a logical "1" is indicative of the fact that $|y| > |x|$;

a double-pole-double-throw (DPDT) electronic switch having first and second poles operatively connected to the output of said magnitude comparing means, a first set of terminals being operatively connected to the x-axis absolute value output and a second set of terminals being operatively connected to the y-axis absolute value output of said absolute value generating means, the output of said magnitude comparing means controlling the position of said DPDT electronic switch that the smaller of the absolute value of x or y is always fed to said first pole and the larger of the absolute values of y or y is always fed to said second pole;

an analog-to-digital converter connected at an $I_{IN}$ input to said first pole of said DPDT electronic switch and operatively connected at an $I_{REF}$ input to said second pole of said DPDT electronic switch, said analog-to-digital converter being configured for ratiometric measurements, wherein the digital output is the ratio $I_{IN}/I_{REF}$ of the analog inputs, and wherein said analog-to-digital converter computes the ratio y/x for the angles 335° thru 45° and 135° thru 225° and the ratio x/y for the remaining angles 45° thru 135° and 225° thru 335°;

means connected to said means for detecting the polarities of the x-axis signal and the y-axis signal ($S_x^*$ and $S_y^*$ respectively) and operatively connected to a data valid (DV) output of said analogto-digital converter at its STR input for latching the polarity of the axis information at the end of each analog-to-digital conversion upon the application of a DV signal to eliminate the effects of changing polarities of the axes of said two-axis earth's magnetic field sensor during rotation thereof while a bearing indication is being presented, wherein $S_x$ is representative of $S_x^*$ after storage and $S_y$ is representative of $S_y^*$ after storage;

a first exclusive-OR circuit connected to said means for storing axes polarity data for generating the logic signal $S_x \oplus X_y$ at its output;

a second exclusive-OR circuit connected to the output of said first exclusive-OR circuit and connected to the output of said means for comparing the magnitudes of the x-axis signal and the y-axis signal for generating the logic control signal $S_x \oplus S_y \oplus (|y| > |x|)$;

a first memory unit operatively connected to the output of said analog-to-digital converter and connected to the output of said second exclusive-OR circuit and being programmed in such a fashion as to compute the arc tangent of the ratio y/x or the ratio x/y according to the output of said analog-to-digital converter and the logic control signal $S_x \oplus S_y \oplus (|y| > |x|)$, and said memory unit being programmed in such a fashion as to output a quadrant displacement angle in binary-coded-decimal form from 0° thru 90° referenced to the cardinal point forming the lower boundary of the quadrant of interest, the D0 thru D3 outputs of said first memory being the units digit of the digital bearing in BCD form; and a second memory unit operatively connected to the output of said analog-to-digital converter, operatively connected to the output of said first memory unit, connected to the output of said first exclusive-OR circuit and connected to the $S_y$ output of said means for latching, and being programmed in such a fashion as to compute the tens and hundreds digits of the digital bearing in BCD form.

13. An improved digital compass according to claim 12 further comprising means operatively connected to said two-axis earth's magnetic field sensor for conditioning the x-axis signal and the y-axis signal therefrom.

14. An improved digital compass according to claim 13 further comprising means connected between said second pole of said DPDT electronic switch and the $I_{REF}$ input of said analog-to-digital converter for inverting the analog signal thereat.

15. An improved digital compass according to claim 14 further comprising means connected between the data valid (DV) output of said analog-to-digital converter, the store (STR) input of said means for latching and the complement store ($\overline{STR}$) input of said first memory unit for inverting the digital signal thereat.

16. An improved digital compass according to claim 15 further comprising means, operatively connected between the DV output of said analog-to-digital converter and the complement store ($\overline{STR}$) input of said second memory unit, for delaying the DV signal thereat.

* * * * *